United States Patent [19]

Janiszewski

[11] 4,204,088
[45] May 20, 1980

[54] MEANS FOR ESTABLISHING VARIOUS COMMUNICATION CONDITIONS IN A CRYPTOGRAPHIC SYSTEM

[75] Inventor: Stephen Janiszewski, Chicago, Ill.

[73] Assignee: Teletype Corporation, Skokie, Ill.

[21] Appl. No.: 636,217

[22] Filed: Dec. 20, 1945

[51] Int. Cl.² ............................................. H04L 9/00
[52] U.S. Cl. ........................................... 178/22; 35/4
[58] Field of Search .................. 178/22; 179/1.5; 35/4

[56] References Cited

U.S. PATENT DOCUMENTS

| 2,458,406 | 1/1949 | Nichols | 178/22 |
| 3,965,296 | 6/1976 | Miller | 178/22 |

*Primary Examiner*—Howard A. Birmiel
*Attorney, Agent, or Firm*—J. C. Albrecht

EXEMPLARY CLAIM

4. In a telegraph system, interconnected stations, converters at each station comprising transmitting and receiving apparatus, a signal line connected to said stations, said transmitting apparatus comprising a series of cam controlled transmitting contacts, means for controlling said contacts permutably, and means for altering the control imparted to said contacts by said means, said receiving apparatus comprising a selector mechanism responsive to enciphered signals generated by any transmitting apparatus, and means for retranslating said altered signal to effect printing in correspondence thereto, an electromagnetically controlled ciphering device at each station, and pulsing means cyclically operable by said receiving apparatus for controlling said ciphering device, whereby said altering means is rendered effective.

5 Claims, 26 Drawing Figures

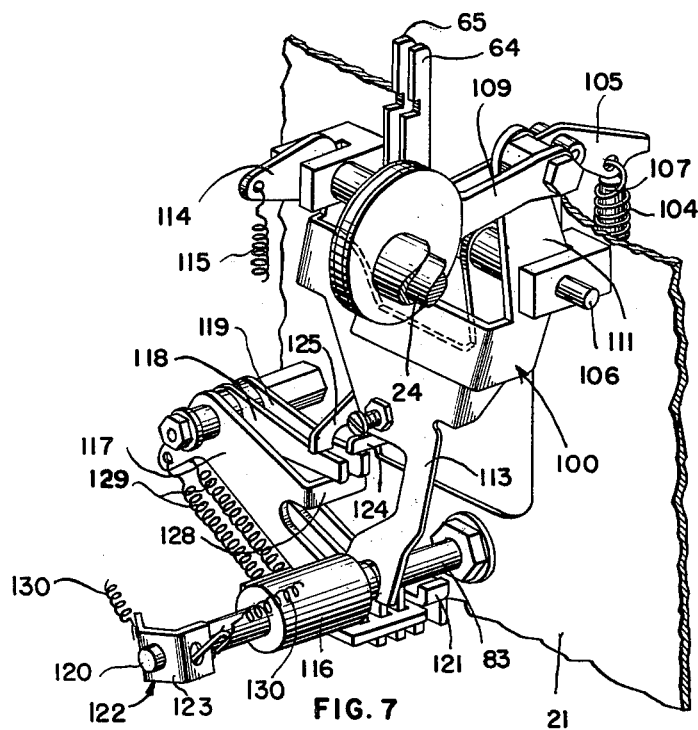
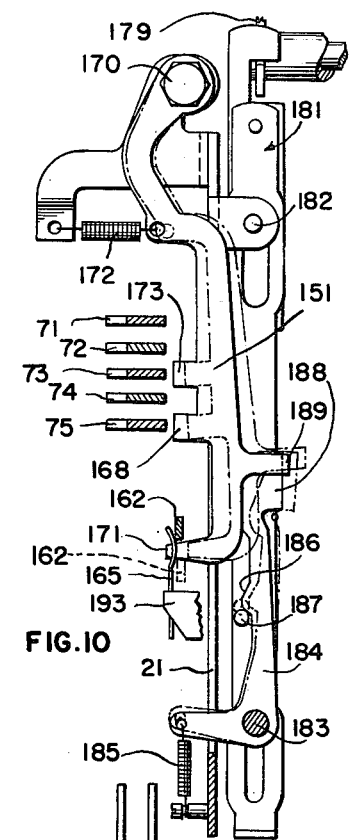
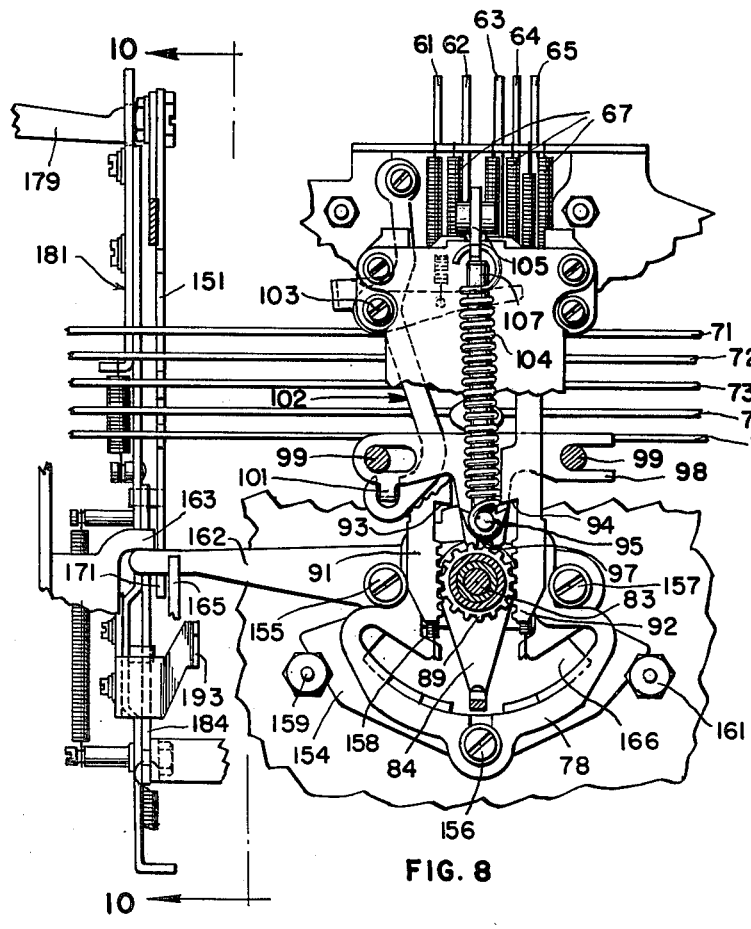
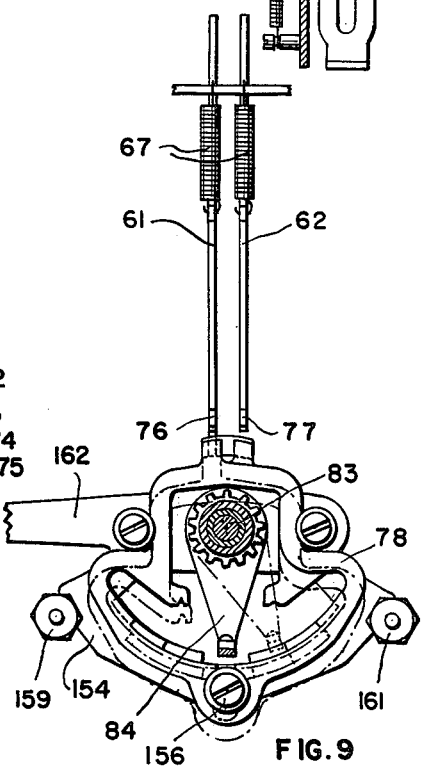

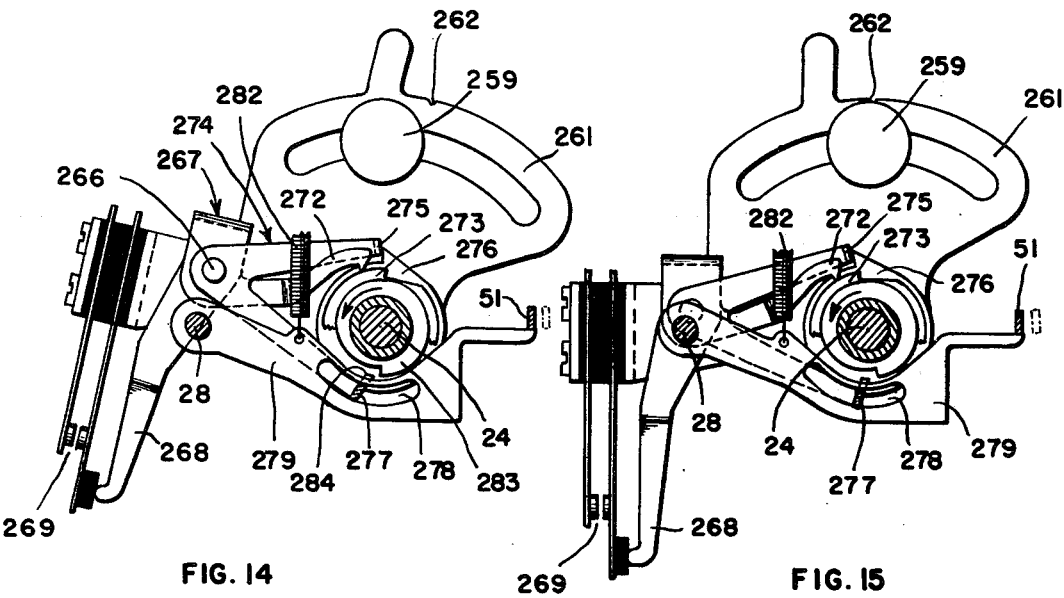
FIG. 14
FIG. 15
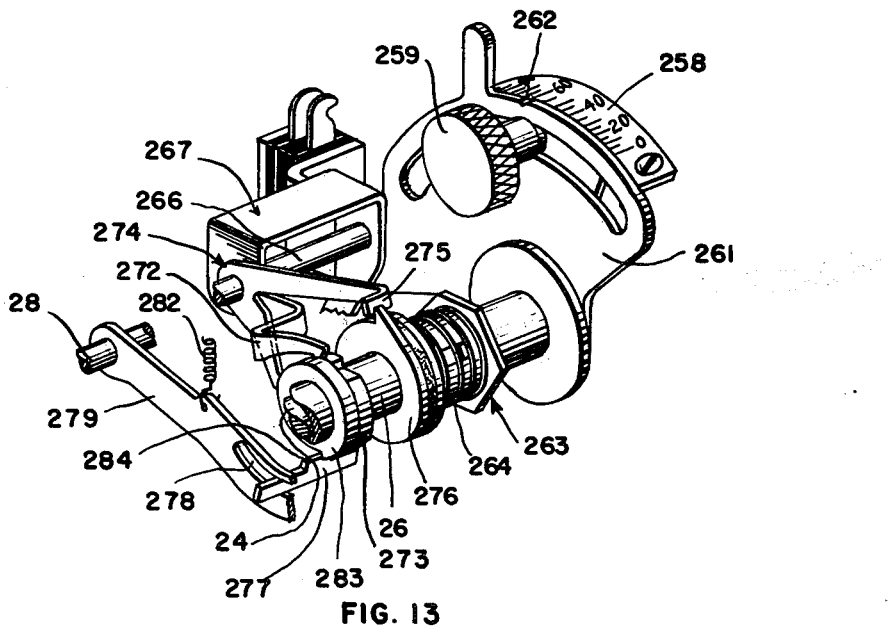
FIG. 13

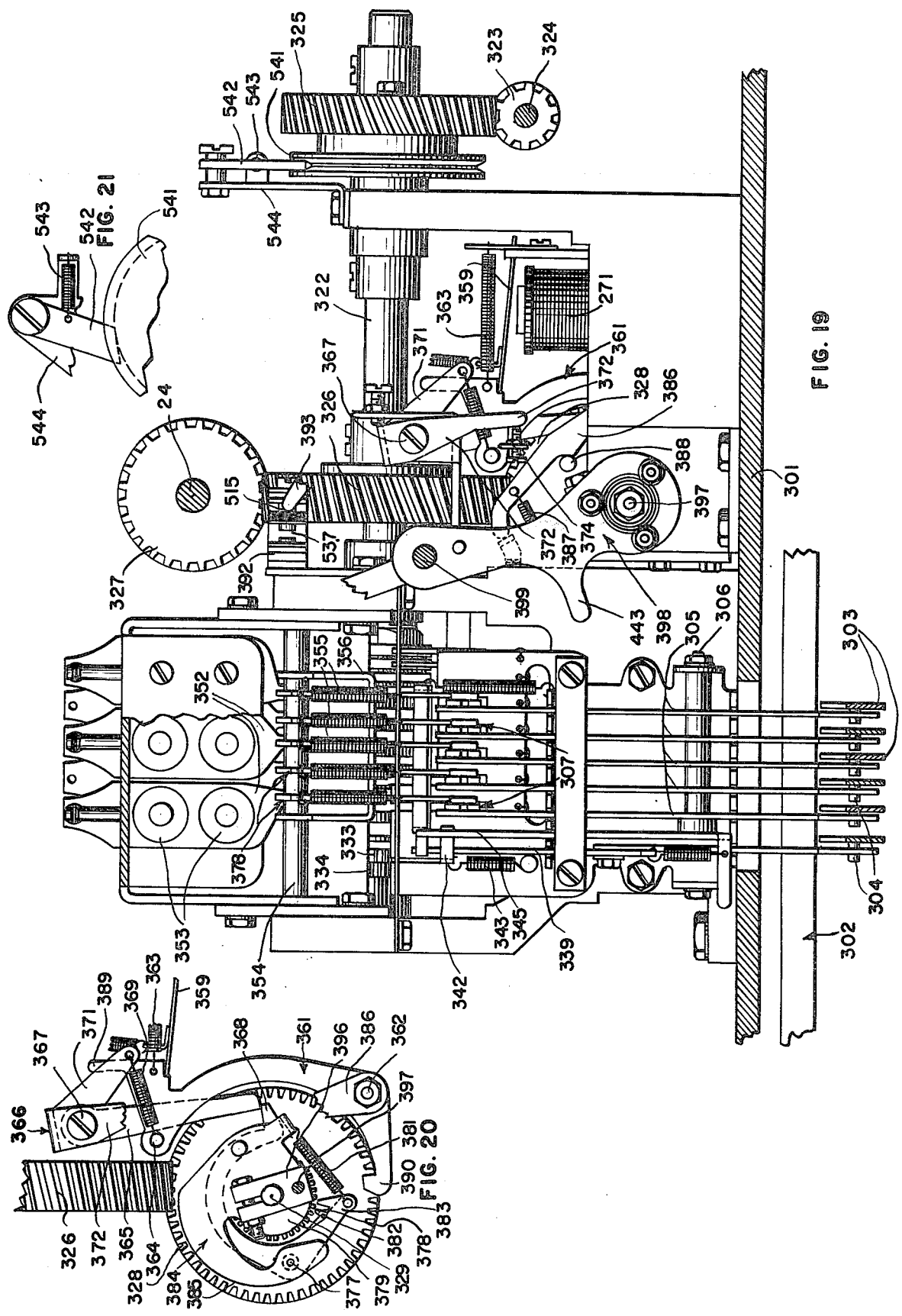

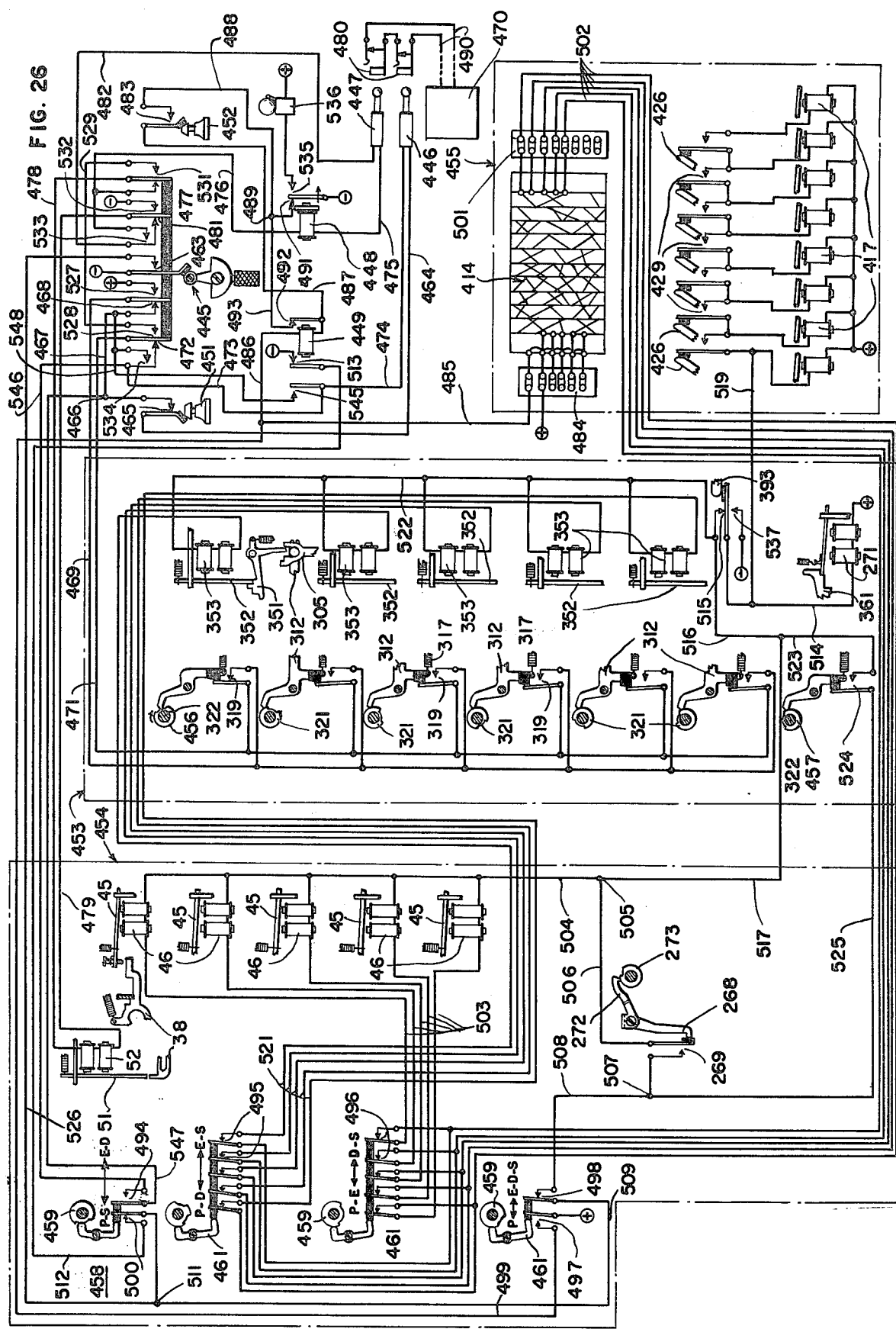

MEANS FOR ESTABLISHING VARIOUS COMMUNICATION CONDITIONS IN A CRYPTOGRAPHIC SYSTEM

This invention pertains to printing telegraph systems and apparatus and more particularly to an arrangement for communicating information in plain or enciphered form.

A primary object of the invention is to provide simple, compact and reliable facilities in telegraph systems and apparatus for converting messages from ciphered form to intelligible form and vice versa to facilitate the secret communication of messages.

Another object of the invention is to provide a telegraph system and apparatus therefor for rendering messages unintelligible to unauthorized persons.

Signaling systems are desirable for naval, military, and civil purposes wherein it is required that messages be rendered unintelligible to persons unauthorized to receive them. Surreptitious interception of messages may be accomplished by unauthorized persons, for example, in the case of wire communications by tapping signal wires, and in radio communication by means of receiving apparatuses tuned to the proper frequencies.

In order to encipher messages by the present system and apparatus, the elements of the code combinations of the original, intelligible message are combined with the elements of code combinations provided by a ciphering device or maze. According to the principles of the present invention, opposite signaling conditions produce a marking signal, that is, with one impulse element of the original code combination marking and with the corresponding impulse element of the key code combination of spacing nature, then the resultant signal impulse is of marking nature. On the other hand, however, like signaling conditions, that is, with both impulse elements marking or both elements of spacing nature, produce spacing signals. This presumes, of course, that each of the elements of the respective code combinations are related to each other. That is, the No. 1 element of the original code combination is combined with the No. 1 element of the key code combination, and so forth. To take a specific illustration, let it be assumed that it is desired to encipher the character "R" which in the Baudot code is composed of spacing, marking, spacing, marking, and spacing conditions. Let it be further assumed that the code wheels of the ciphering device with which the particular enciphering operation is to be performed occupy such a position whereat it is conditioned for producing the letter "Y" combination which in the Baudot code is composed consecutively of marking, spacing, marking, spacing, and marking conditions. Under the assumed conditions, the enciphering operation would result in the production of an all marking or "letters" combination, since in this particular illustration opposite conditions of all the related elements of "R" and "Y" code combinations are provided. This will be readily apparent from the following chart wherein the letter "M" indicates a marking condition and the letter "S" indicates a spacing condition.

|  | 1 | 2 | 3 | 4 | 5 |
|---|---|---|---|---|---|
| Original Signal "R" | S | M | S | M | S |
| Key Signal "Y" | M | S | M | S | M |
| Enciphered Signal "Letters" | M | M | M | M | M |

It is understood that both the transmitting and receiving stations of a telegraph system will be equipped with identical ciphering devices, the code wheels of which during message transmission will occupy identical positions. During transmission the code wheels of the ciphering devices are rotated or stepped between characters to modify the key signal, but both sets of code wheels occupy the same corresponding position at all times. A station which receives enciphered signals is thus enabled to decipher the unintelligible signals transmitted over the telegraph line by combining enciphered signals with key signals provided by the ciphering device or maze.

To illustrate a deciphering operation, the example given above in connection with the enciphering operation will be continued and it will be assumed that a receiving station received the enciphered signal; namely, "Letters." The "Y" combination provided by the ciphering device at the receiving station can now be combined with the received "Letters" combination to decipher the enciphered signal to thereby reproduce the original signal "R," as clearly shown in the following chart:

|  | 1 | 2 | 3 | 4 | 5 |
|---|---|---|---|---|---|
| Enciphered Signal "Letters" | M | M | M | M | M |
| Key Signal "Y" | M | S | M | S | M |
| Original Signal "R" | S | M | S | M | S |

The transmitter, receiver, and ciphering device according to the present invention are associated and combined through the medium of electrical circuits whereby various communication conditions may be readily established. Through suitable switching means, conditions can be set up for communicating secret messages, plain English messages enciphering or deciphering of messages. In preparing an enciphered message locally, not only is the message enciphered but also the spacing mechanism is conditioned to insert automatically an extra space every fifth character.

Reference is made to copending applications Ser. Nos. 636,125 and 636,216 filed on Dec. 20, 1945, covering the printer and transmitter, respectively.

A more comprehensive understanding of the invention may be had by reference to the following detailed description when considered in conjunction with the accompanying drawings, wherein, FIG. 1 is a front elevational view of the printing unit according to the present invention;

FIG. 7 is a fragmentary rear perspective view of the printer showing the type wheel control mechanism;

FIG. 8 is a partial rear elevational view of the type wheel operating mechanism and the shift mechanism;

FIG. 9 is a view showing certain operative conditions of the type wheel stop plates;

FIG. 10 is a sectional view taken on line 10—10 of FIG. 8;

Figure 16:
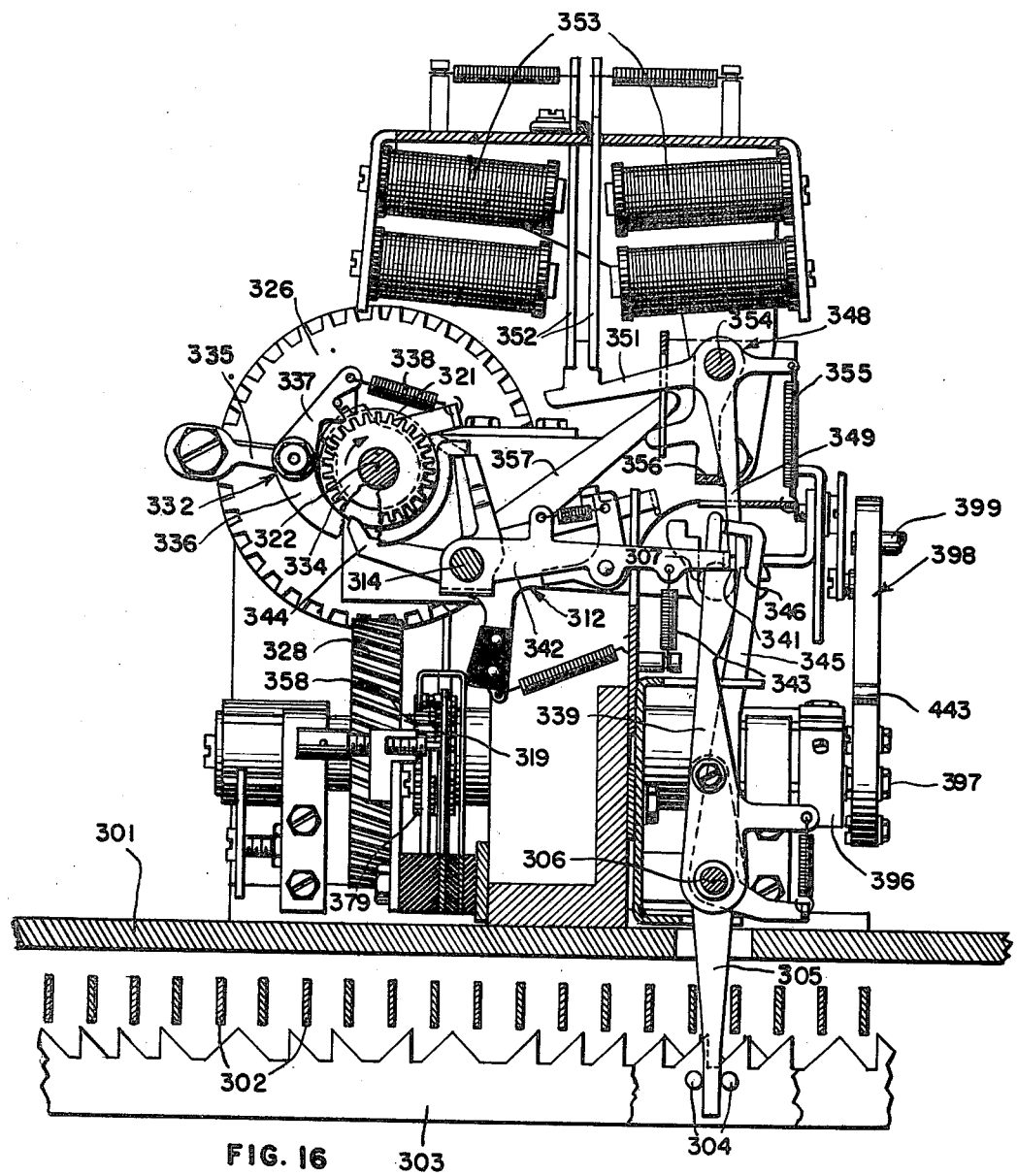
Figures 17, 18:
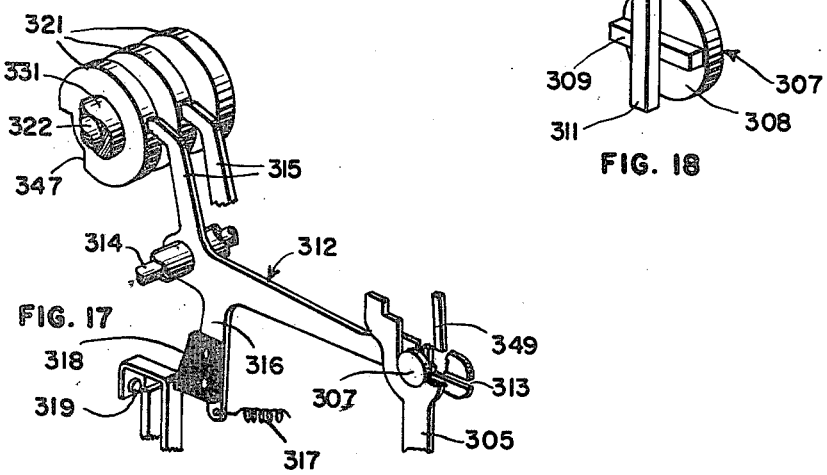
Figure 22:
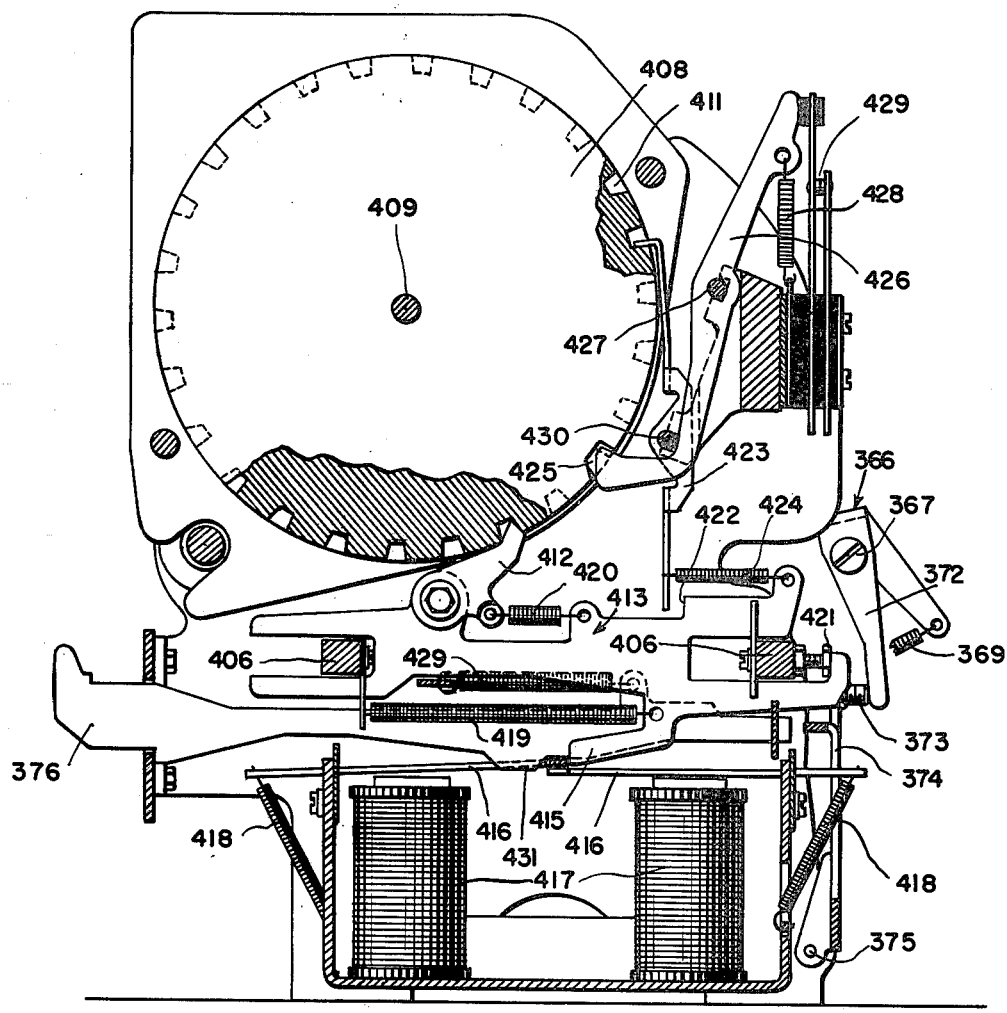
Figure 23:
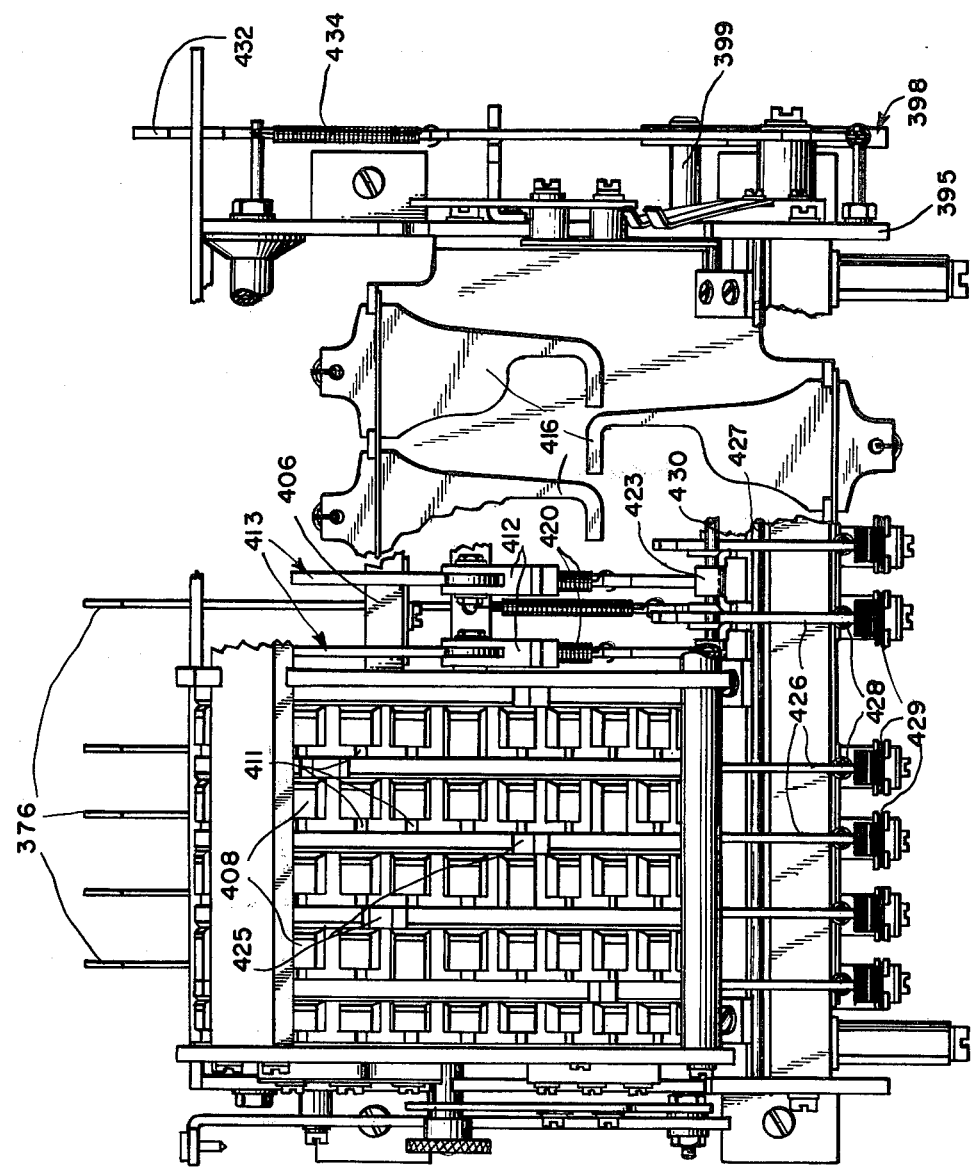
Figure 24:
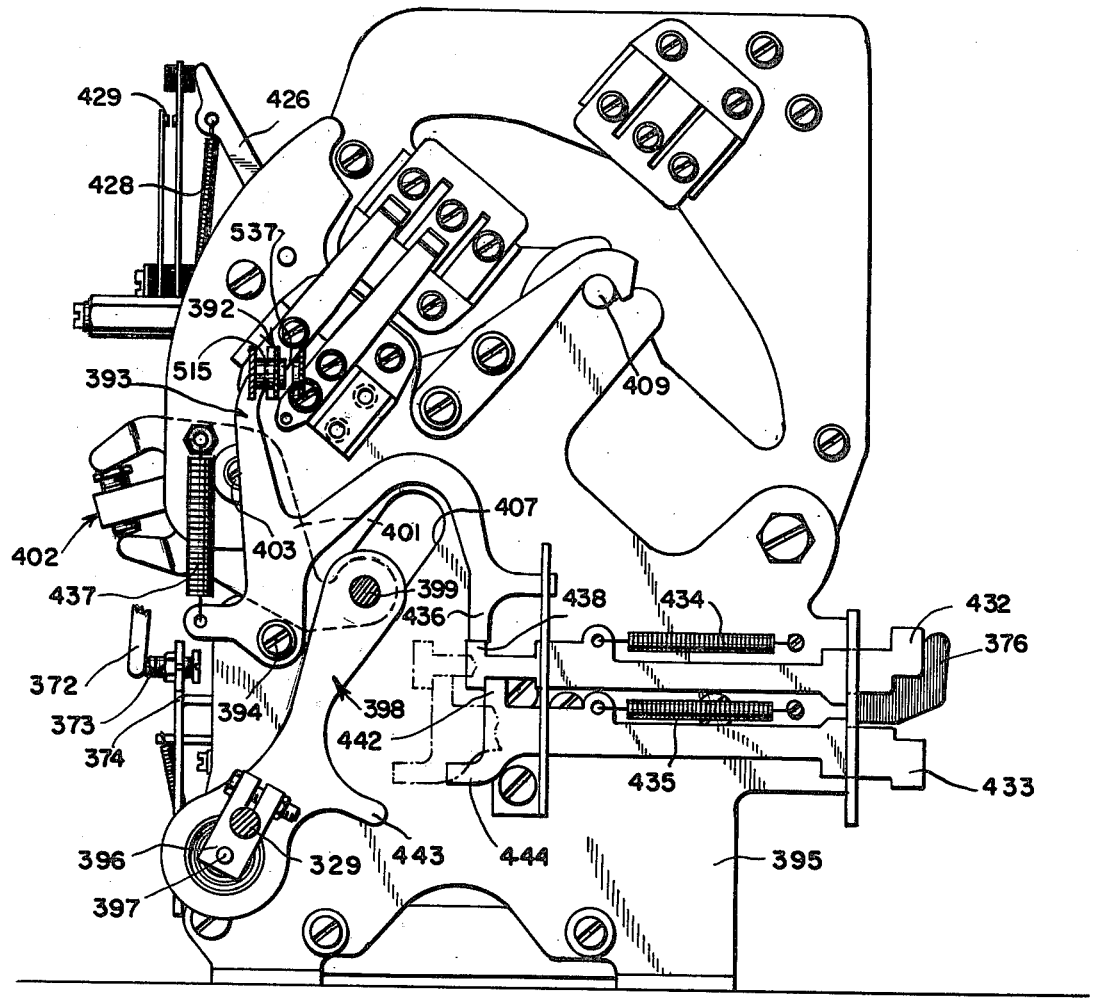
Figure 25:
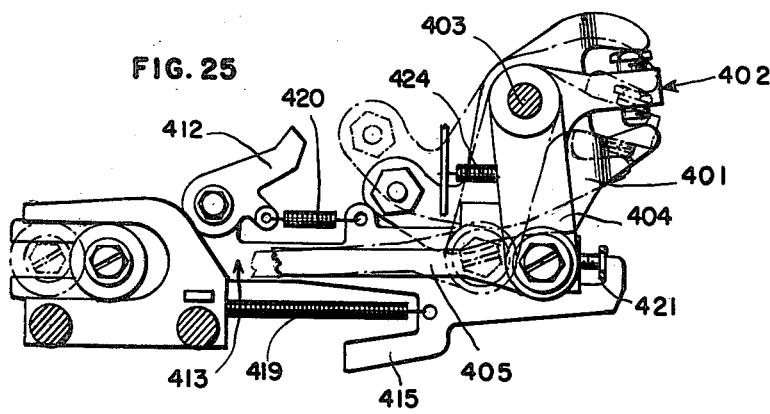

FIGS. 13, 14, and 15 are various views showing the start-stop and orientation devices;

FIG. 16 is a front elevational view, partly in section, of the transmitting mechanism according to the present invention;

FIG. 17 is a fragmental perspective view of the transmitting contact operating mechanism;

FIG. 18 is a perspective view of the coupling element for the transmitter contact operating levers;

FIG. 19 is a side elevational view of the transmitting unit;

FIG. 20 is a view showing the transmitter clutch mechanism;

FIG. 21 is a fragmental view showing a brake mechanism for the transmitter shaft;

FIG. 22 is a cross sectional view of the ciphering device;

FIG. 23 is a plan view of the ciphering device with parts broken away to show internal elements;

FIG. 24 is an end elevation of the ciphering device;

FIG. 25 is a fragmental view showing parts of the ciphering device, and

FIG. 26 is a schematic circuit arrangement of the apparatus according to the present invention.

Figure 12:
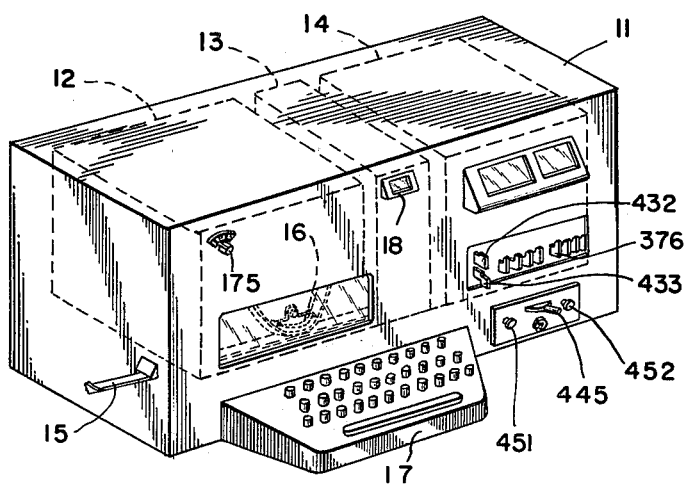
FIG. 12 is a perspective view of the combined apparatus according to the present invention.

Referring now to the drawings wherein like reference characters indicate the same part throughout the several views and particularly to FIG. 12, there is shown the combined apparatus according to the present invention enclosed in a housing 11, and comprising subunits 12, 13, and 14 identified as the printing unit, transmitting unit and ciphering unit, respectively. A tape 15 is shown emerging from the housing 11 after having a record printed thereon by the typing elements exemplified by the type wheel 16.

The transmitting mechanism comprises, besides the unit 13, a keyboard 17. An operation counter (not shown) is embodied in the transmitting unit and a viewer 18 is provided in the housing 11 adjacent said counter to note the reading thereof. The accessories associated with the ciphering device 14 and extending through the front of the housing 11 will be described hereinafter.

Figure 4:
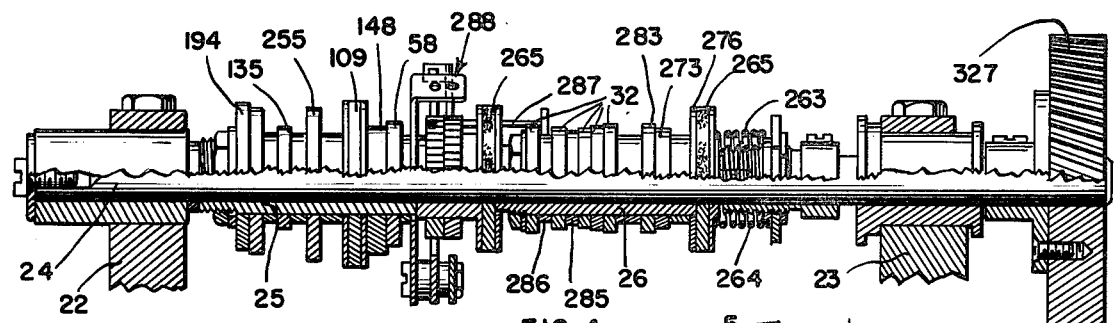
FIG. 4 is a view, partly in section, of the main operating shaft.

Having reference to FIGS. 1 to 4, the printing unit 12 includes a main supporting frame 19 and a front mounting plate 21 secured to said frame. Suitably journaled in brackets 22 mounted on frame 19 is a main operating shaft 24 which carries the function cam sleeve 25 and selector cam sleeve 26 (FIG. 4). Associated with the selector cam sleeve 26 is a plurality of selector levers 27, mounted pivotally on a rod 28 journaled in a top frame member 29 supported on side frames 19. Each lever 27 is provided with a cam follower portion 31 which cooperates with a selector cam 32. Levers 27 are normally biased in a clockwise direction (FIG. 2) by springs 33 to urge the cam follower portions 31 against the peripheries of their associated cams 32. The free end of each lever 27 cooperates with a shoulder 34 at the upper extremity of one of the code bars 61 to 65, of which there are a series corresponding in number of the number of levers 27. Each lever 27 is provided with a projection 36 which fits slidably into the open-ended slot 37 of a ciphering lever 38. Levers 27 and 38 are guided in a comb bar 39 fastened to top frame member 29.

Each lever 38 is provided with a shoulder 41 which in the normal position of the lever 38 (FIG. 2) bears against a plate 42 when the lever 38 is biased upwardly and rightwardly by its spring 43. The ends 44 of levers 38 cooperate with armatures 45 of ciphering magnets 46. When the magnets 46 are energized the armatures 45 are attracted thereby causing the screws 47 therethrough to strike the ends 44 of levers 38 and bias them in a clockwise direction to disengage shoulder 41 from the plate 42 and permit spring 43 to urge the lever 38 rightwardly until the limit stop 48 engages the plate 42. Each lever 38 is provided with a vertical portion 49 which is adapted to cooperate with the selector armature 51 of a selector magnet 52, carried on a bracket composed of elements 53 and 54 secured to top frame member 29. The selector magnet 52 is shown in FIG. 2 as energized in response to the normal marking condition of the signal line, thereby holding the armature 51 attracted against the pull of spring 55.

Figure 2:
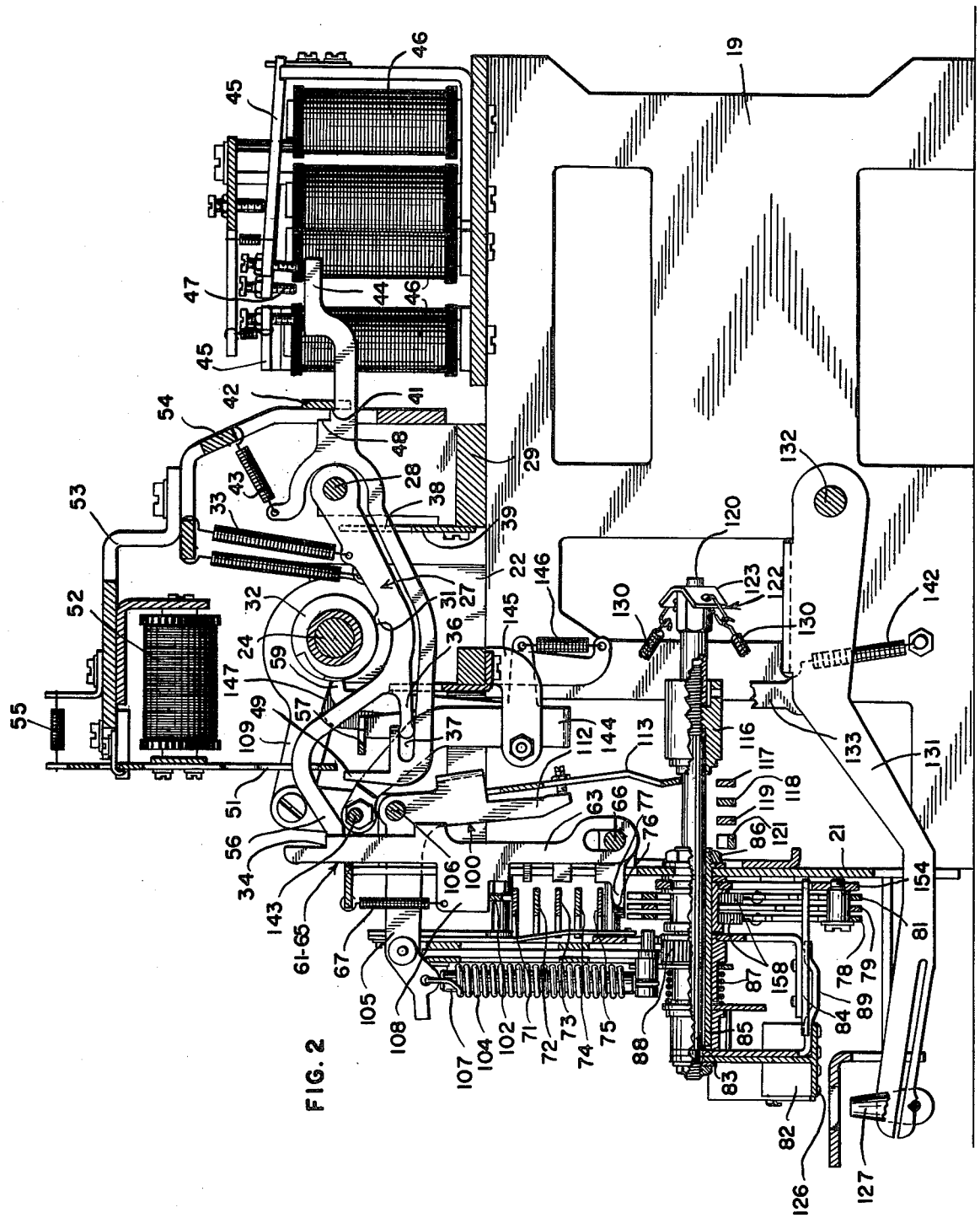
FIG. 2 is a sectional view of the printer taken substantially on line 2—2 of FIG. 1.
Figure 3:
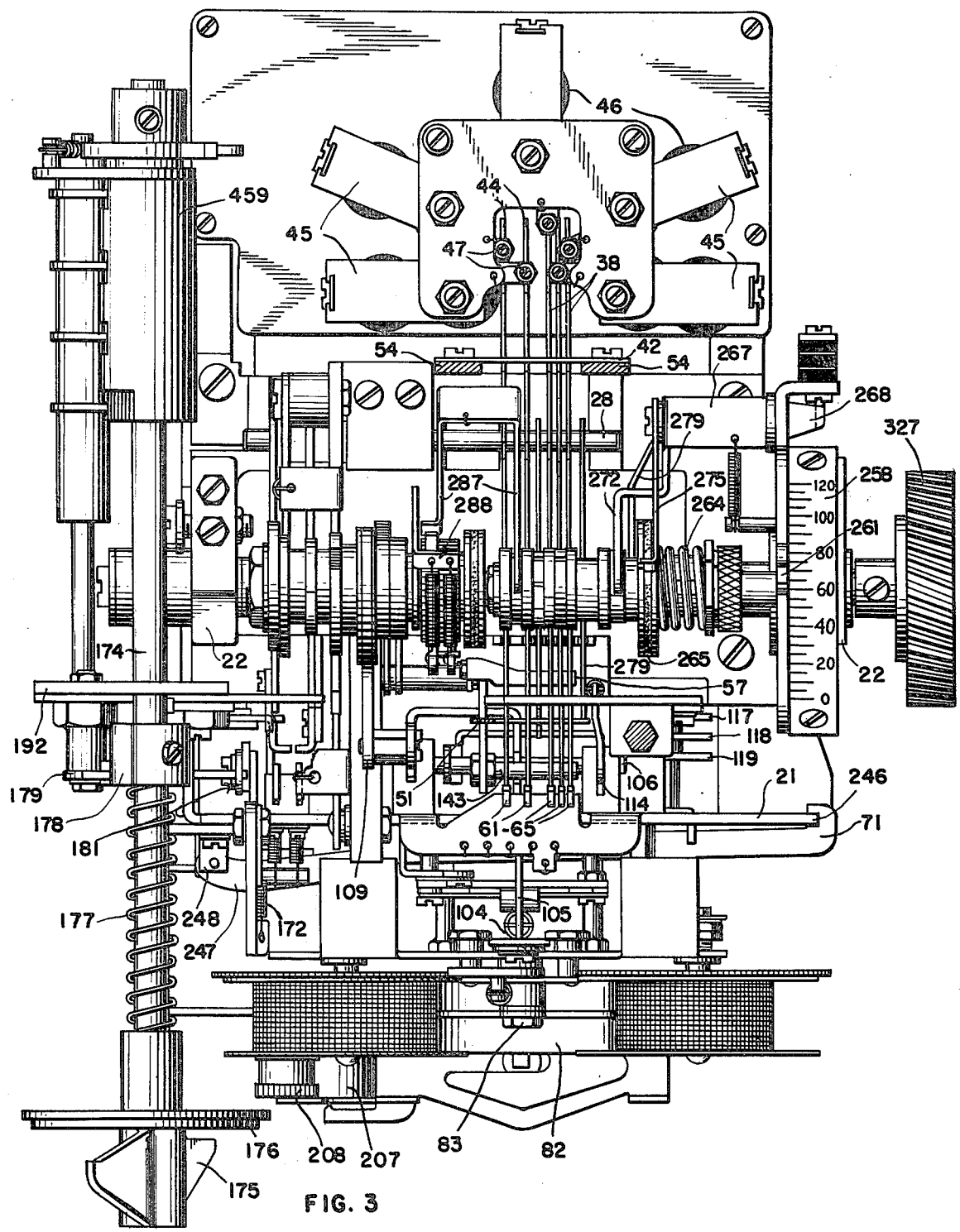
FIG. 3 is a top view of the printing unit.

In this condition of operation with the parts as shown in FIG. 2, the lever 27 upon encountering a cam notch in cam 32 will be actuated clockwise by its spring 33 since the portion 49 of lever 38 is not blocked by the armature lever 51. If at the time magnet 52 is energized, magnet 46 is also energized, the lever 38 will be tripped at the shoulder 41 and the lever 38 would be urged rightwardly to bring limit stop 48 against plate 42 and portion 49 would be positioned beneath armature lever 51. Then when the notch in cam 32 registers with follower portion 31 the levers 27 and 38 will not be rotated clockwise. In a similar manner, in response to a spacing condition of the signal line, magnet 52 will be de-energized and armature 51 will be actuated to its clockwise position by spring 55 to bring the extremity thereof over the portion 49, and since levers 38 remain in their leftward position when magnets 46 are unenergized, levers 27 and 38 will not be rotated clockwise when the notch in cam 32 registers with the cam follower portion 31. Thus it is seen that when magnet 52 and magnets 46 are energized or marking or when said magnets are unenergized or spacing, the portion 49 will be blocked by the armature 51. On the other hand, if the magnet 52 is energized in response to a marking condition and the magnets 46 are unenergized in response to a spacing condition, or vice versa, the portion 49 will not be blocked by the armature 51 and levers 27 and 38 will be permitted to rotate, thereby enabling extremity 56 of lever 27 to cooperate with shoulder 34 as will hereinafter appear. After shoulders 41 having been disengaged from plate 42 and levers 38 actuated rightwardly by springs 43, said levers 38 are returned to their leftward position (as shown in FIG. 2) by a bail 57 operated by a cam 58 on shaft 24 through follower arm 59. The cams 32 are of similar cam contour but are displaced on the shaft 24 angularly so that the peripheral cam notches thereon are disposed in a helically arranged series whereby coaction with the cam followers 31 will occur in a sequential manner as the series of cams 32 rotate in synchronism with the speed of code impulsing.

As previously described, levers 27 cooperate with a corresponding series of code bars 61 to 65 which are disposed vertically in the machine and are slidably mounted on a rod 66. Code bars 61 to 65 are normally biased upwardly by individual springs 67. Springs 67 also tend to rotate code bars 61–65 clockwise about rod 66 causing them to bear against the ends 56 of levers 27. Bars 61 to 65 are coded in well known manner to effect the selection of a series of function control bars 71 to 75 which are carried horizontally on the plate 21 and disposed transversely of the code bars 61 to 65 adjacent the coded portion thereof.

When a lever 27 is permitted to rotate clockwise due to the fact that its cam follower 31 encounters a notch in cam 32 and portion 49 is not blocked by armature 51, the end 56 will be raised sufficiently due to the action of spring 33 to permit shoulder 34 to be presented therebelow, and upon continuation of rotation of cam 32 lever 27 will be actuated counterclockwise to, in turn, actuate its associated code bar 61–65 downwardly thus altering the selective alignment of the code notches which effect the selections of bars 71 to 75.

As viewed in FIGS. 2 and 9, code bars 61 and 62 are provided at their lower ends with extensions 76 and 77, respectively, which cooperate with a series of stop plates 78, 79, and 81 in the manner disclosed in U.S. Pat. No. 2,339,313, issued Jan. 18, 1944, to W. J. Zenner, to effect the selection of the character on the type segment 82 to be printed. Type segment 82 is secured to a shaft 83, and associated with the type segment 82 is a type segment stop arm 84 which cooperates with the internally cut notches on the stop plates 78, 79, and 81. Shaft 83 is journaled in a supporting sleeve member 85 which is secured to plate 21 by a nut 86. Stop arm 84 is secured to a sleeve member 87 which is provided integral therewith with a pinion gear portion 88. Stop arm 84 is operatively connected to type segment 82 through a forked member 89 fixedly related to said type segment.

Pinion gear 89 is adapted to mesh with a pair of racks 91 and 92 which are slidably mounted in the apparatus for vertical reciprocation therein. Racks 91 and 92 are provided with confronting shoulders 93 and 94, respectively, which cooperate with a rack pawl 95 having a pair of oppositely directed pawl teeth. Pawl 95 is provided with an extension 96 (FIG. 2) which fits into an open ended slot 97 in a shuttle member 98 mounted for reciprocation on studs 99. Member 98 is provided with a depending portion 101 through which pivotal articulation is obtained with a bell crank lever 102 pivoted at 103.

A spring 104 (FIGS. 2 and 8) is extended between pawl 95 and the horizontal arm 105 of a centralizer bail member 100 pivotally mounted on a rod 106. A spacer rod 107 is inserted within the spring 104 and determines the minimum distance between pawl 95 and arm 105. Code bar 63 is provided with a projection 108 which cooperates with the horizontal arm of bell crank lever 102, such that when code bar 63 is actuated downwardly by its associated selector lever 27 in response to the third impulse of the code signal (when said impulse is of marking conditions), the projection 108 functions to rotate bell crank lever 102 in a clockwise direction (as viewed in FIG. 8) thereby, through depending portion 101, actuating member 98 leftwardly to bring the left pawl tooth of pawl 95 into operative relationship with shoulder 93 of rack 91.

Power for operating bail 100 is derived from shaft 24 through an eccentric 109 clutch driven thereon (FIGS. 2 and 7). Eccentric 109 (FIG. 7) is pivotally articulated to arm 111 of bail 100. Bail 100 has integral therewith (as shown in FIG. 2) a depending arm 112 which cooperates with a type segment reset bail 113 also mounted on pivot shaft 106. Reset bail 113 is provided with an arm 114 to which is attached a light biasing spring 115, the effect of which is to cause bail 113 normally to follow the arm 112. The lower extremity of bail 113 is forked and is adapted to straddle the type segment shaft 83 so that bail 113 in its counterclockwise position (as viewed in FIGS. 2) bears against a sleeve 116 carried on shaft 83 to hold shaft 83 and, therefore, type segment 82 in their rightward position clear of the printing zone to afford visible printing.

The leftward movement of the type segment 82 (FIG. 2) to effect printing from any of the four rows of type is controlled by a series of location levers 117, 118, and 119, and a fixed stop 121 in cooperation with a type segment actuating spring arrangement identified generally by the numeric 122. The actuating spring arrangement 122 comprises a plate 123 loosely mounted on a stud 120. Springs 130 are attached to each end of plate 123, the other ends of springs 130 being secured to the front plate 21. The location levers 117, 118, and 119 are controlled by code bars 64 and 65 which are provided at their lower ends with projections 124 and 125, FIG. 7. The lower arms of location levers 117, 118, and 119 are normally in the path of sleeve member 116 so that if neither of the code bars 64 nor 65 are selectively operated, the sleeve 116 will biased leftwardly by springs 130 to abut the location lever 117 and present the first row 126 of the type segment 82 above the print hammer 127 in printing position. Location lever 117 is provided with a laterally extending projection 128 which underlies the horizontal arms of location levers 118 and 119. To effect printing from the second row of type, the code bar 64 is selectively operated, which, through projection 128, rotates lever 117 clockwise (as viewed in FIG. 7) against the pull of its spring 129, thereby presenting lever 118 to the sleeve 116. If printing is to be effected from the third row, then the code bar 65 is selectively operated so that its projection 125 will rotate lever 118, which, through projection 128 also rotates lever 117 to present lever 119 to the sleeve 116. If printing is to be effected from the fourth row, code bars 64 and 65 are both operated to remove levers 117, 118, and 119 out of blocking relation with sleeve 116 and permit springs 125 to bias the sleeve 116 to the fixed stop 121.

The print hammer 127 is carried on a printing arm 131 mounted on a pivot shaft 132. A link 133 (FIG. 11) is connected at its lower end to arm 131, and at its upper end to a follower lever 134 mounted on pivot shaft 28 and associated with a print control cam 135. A print operating spring 136 is connected to the free end of lever 134 and to a fixed member 137 secured to the printer frame structure. Link 133 at its connection to print arm 131 is provided with a slotted hole 138 to produce overthrow printing. When the follower lever 134 encounters the drop-off portion of the print control cam 135, the printing spring 136 will impart a sudden impulse to the lever 134 and link 133, which impulse will be transmitted to the print arm 131. The upward movement of link 133 is governed by the depth of the drop-off portion of cam 135. However, the momentum imparted to the print arm is sufficient to carry print hammer 127 sharply against the type segment 82, the slot 138 being sufficiently long to compensate for this movement. It is of course understood that in actual printing operation the tape and inking ribbon are interposed between the type segment and print hammer.

A tape guide 139 is suitably positioned with respect to the print hammer 127 and type segment 82 and is carried by supporting members 141 on plate 21. A spring 142 of very light tension is provided to hold print arm 131 against the bottom of slot 138.

The code bars 61 to 65 which have been engaged on their shoulders 34 by ends 56 of selector levers 27 are disengaged therefrom after each cycle of operation by a reset or stripper bail rod 143 carried on a bail frame 144 pivotally mounted on a bracket 145 secured to the frame 29. A spring 146 normally biases the bail 144 clockwise (as viewed in FIG. 2) to bring the cam follower portion 147 of said bail 144 into contactual relationship with its cam 148 (FIG. 4). Cam 148 is provided with an apex which urges the bail 144 in a counterclockwise direction.

Figure 1:
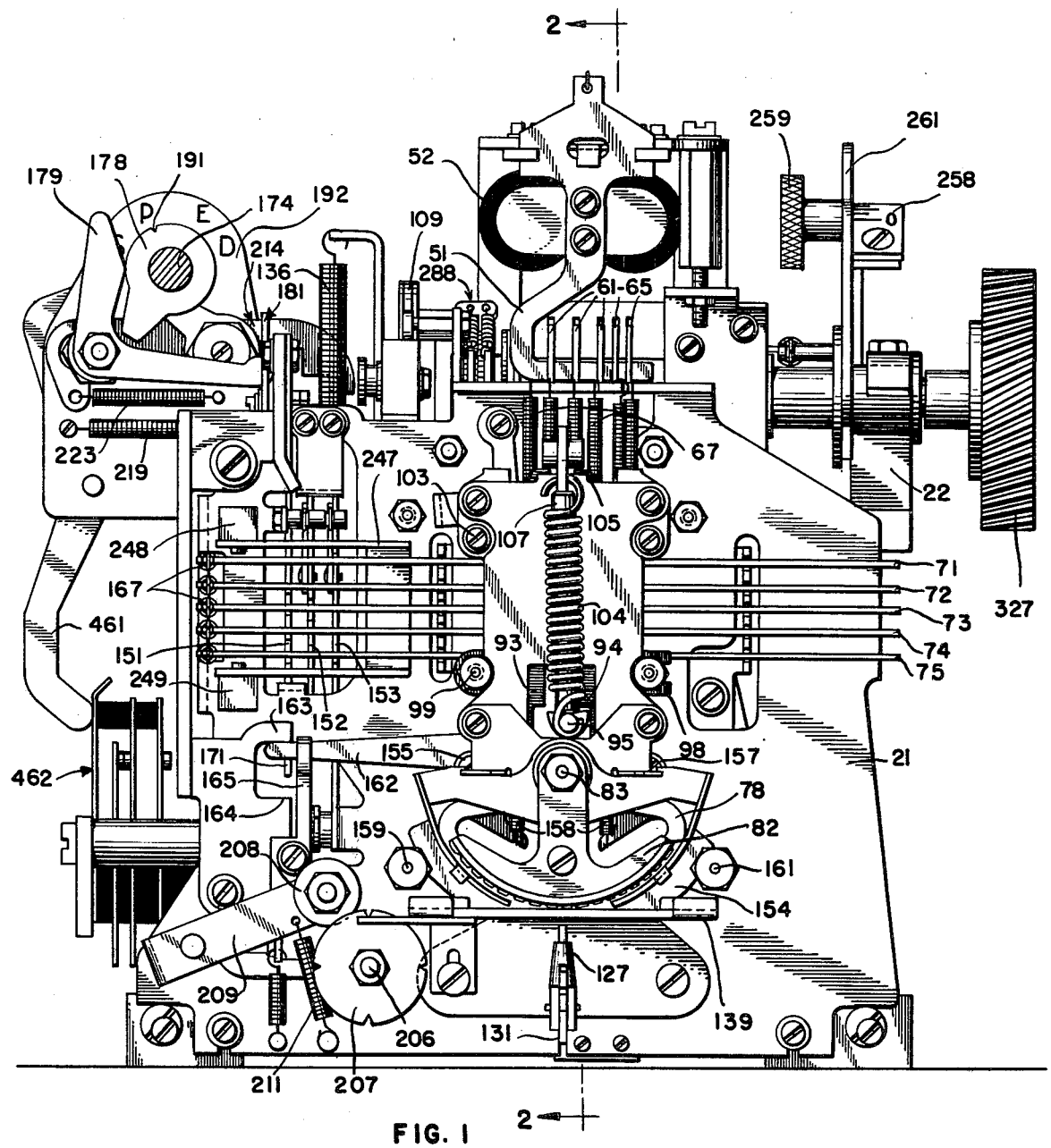

As previously described, the function control bars 71 to 75 control a series of function bars 151, 152, and 153. Function bar 151 governs the shift and unshift functions. Bar 152 governs the space suppression function and bar 153 governs the printing suppression function. Stop plates 78, 79, and 81 are slidably mounted on a shift plae 154, which is pivotally mounted on a shoulder on sleeve 85. Stop plates 78, 79, and 81 are guided in their movement by studs 155, 156, and 157, and springs 158 are provided to hold said stop plates in their upper position. Shift plate 154 is guided in its oscillatory movement by guide studs 159 and 161 and is provided with a stop arm 162 which is operable between stops 163 and 164 (FIG. 1). A flat guide spring 165 (FIGS. 1, 8, and 10) guides arm 163 in its operating plane.

Shift plate 154 is actuated to its clockwise or "letters" (unshift) position and to its counterclockwise or "figures" (shift) position by the stop arm 84 acting against the right-hand end or left-hand end (respectively) of slot 166 in the shift plate 154. The direction of rotation of stop arm 84 is determined by which of the racks 91 or 92 is operated to rotate the pinion 89, and the operation of the racks 91 and 92 is governed by the position of pawl 95 which is determined by the operation of bell crank lever 102 in response to actuation of code bar 63. Since the "letters" code signal is composed of all marking impulses, and since the "figures" code signal is composed of the first and second and fourth and fifth impulses marking and the third impulse spacing, it is apparent then that the third impulse is determinative of the operation of pawl 95. The fact that the fourth and fifth impulses are marking in each instance indicates that all three of the stop plates 78, 79, and 81 are operated and the stop arm is thus enabled to rotate its full distance. Also, upon receipt of either the "letters" unshift signal or the "figures" shift signal, the function control bar 75 will be selected and as this bar is actuated by its spring 167, it will strike against a projection 168 on a blocking lever 151 to swing said lever 151 about pivot 170 to remove the blocking projection 171 thereon out of the path of the stop arm portion 162 of shift plate 154. After the arm 162 is moved to the dotted line position shown in FIG. 10, the lever 151 is returned to its full line position by its spring 172 whereby projection 171 will be positioned above the arm 162, thereby locking the shift plate 154 in its counterclockwise position.

An additional projection 173 is provided on lever 151 which is cooperative with function control bar 73. In response to a space code signal the code bars 61 to 65 assume a setting such that bar 73 is selected and operated to effect, through projection 173, the counterclockwise rotation of lever 151 to remove projection 171 out of blocking relation with arm 162 in the event the shift plate 154 was in the shift or "figures" position. The function of the arrangement just described is to effect the operation of "unshift on space," which assures that the printer mechanism is conditioned for printing in the lower case or "letters" position whenever a space signal is received.

Another arrangement for assuring the conditioning of the printer in the lower case or "letters" position will now be described. Having reference to FIG. 3 there is shown on the left-hand side of the apparatus, a shaft 174 on the front end of which is secured a finger piece 175 adjacent a disc 176. The disc is loosely mounted on shaft 174 and is pressed against finger piece or pointer 175 by a spring 177. Also fixed to shaft 174 is a cam member 178 (FIGS. 1 and 3) which cooperates with a bell crank lever 179. The horizontal arm of lever 179 cooperates with a vertically slidable bar 181 (FIG. 10) suitably mounted on pins 182 and 183 carried on the front plate 21. Pivotally mounted on pin 183 is a lever 184 which is normally urged in a counterclockwise direction (as viewed in FIG. 10) by a spring 185. Lever 184 is provided with a camming portion 186 which cooperates with a pin or stud 187 carried on slide member 181. Lever 184 is also provided with an extension 188 which cooperates with a projection extending from lever 151. Thus, when finger piece 175 is actuated to turn cam 178 angularly to bring the index notch 191 thereon opposite the letter "E" on plate 192 ("E" being indicative of "enciphering") the apex of cam 178 will actuate bell crank 179 counterclockwise (FIG. 1) to raise the slidable bar 181 and in so doing the stud 187 on bar 181 will cause lever 184 to swing clockwise (FIG. 10) to urge, through the coaction of extremity 188 engaging projection 189, the lever 151 counterclockwise to effect the withdrawal of blocking portion 171 from the path of the arm 162 of shift plate 154 so that the portion 193 (FIGS. 8 and 10) may be effective to urge arm 162 to its uppermost or "letters" position. After the stud 187 has passed over the projection 186, the projection 171 will be returned to blocking engagement with arm 162.

Figure 5:
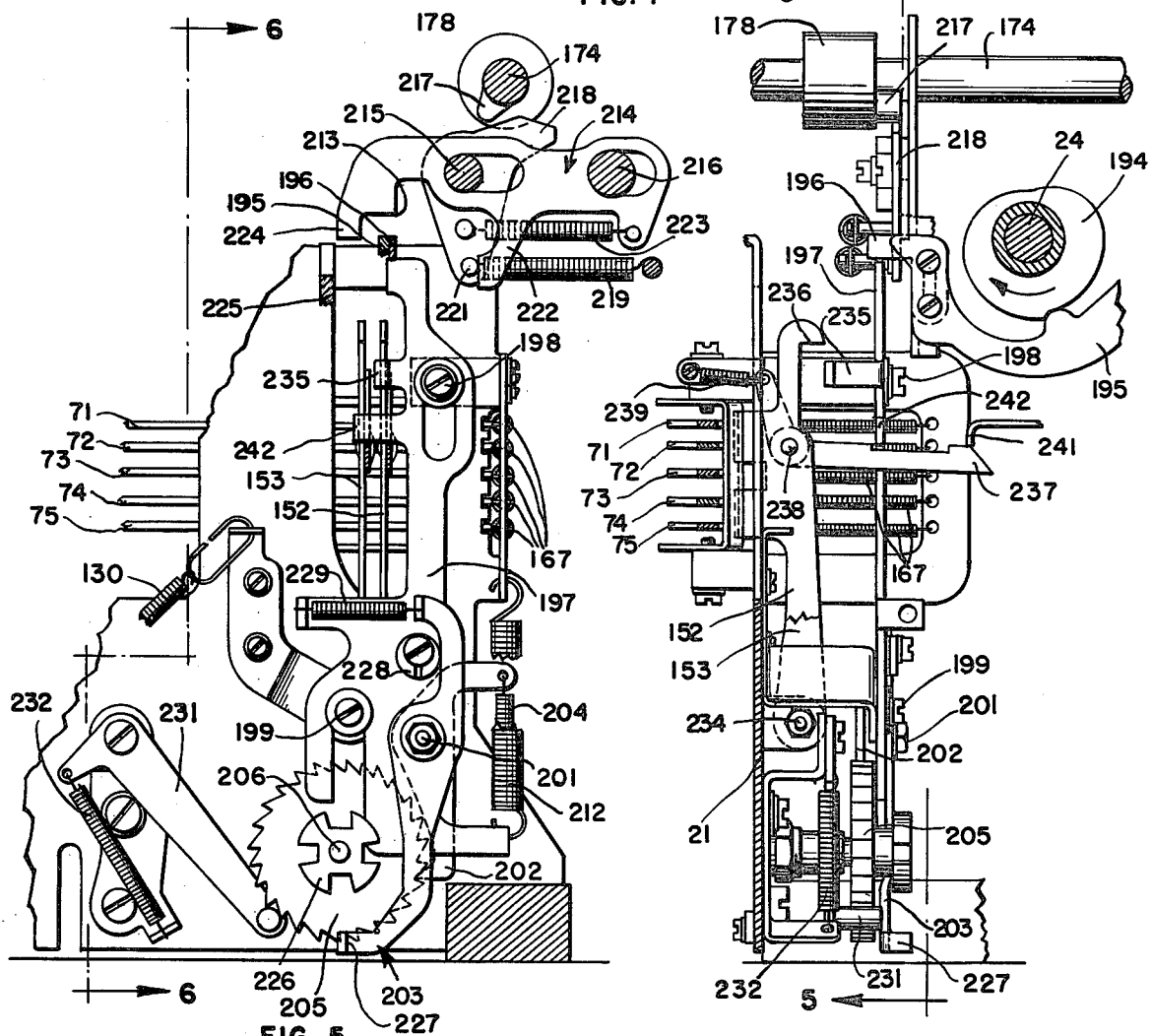
FIG. 5 is a fragmental rear view of the printer showing the spacing mechanism.
Figure 6:
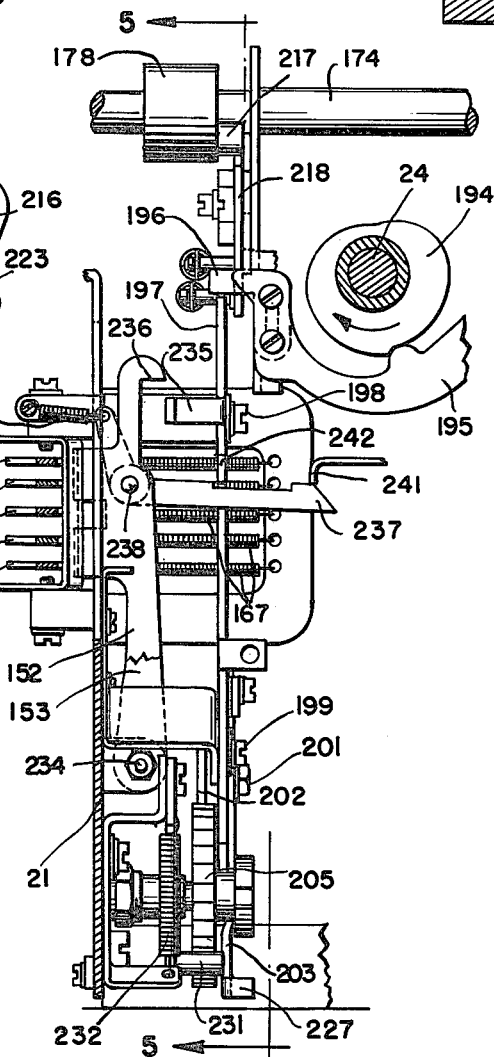
FIG. 6 is a sectional view taken on line 6—6 of FIG. 5.

Referring to FIGS. 5 and 6, the spacing cam 194 is shown mounted on main shaft 24 and controls a spacing or tape feed lever 195 which is mounted pivotally on shaft 28. Lever 195 carries adjustably on its free end a striker portion 196 which cooperates with a tape feed pawl push bar 197 slidably carried on studs 198 and 199. Pivotally mounted on a pivot stud 201 attached to bar 197 are a pair of tape feed pawls 202 and 203. Pawl 202 is normally biased clockwise by a spring 204 into cooperation with a tape feed ratchet 205 so that upon each vertical reciprocation of bar 197 the ratchet 197 is stepped clockwise a single angular step. The ratchet 205 is secured to a shaft 206 suitably journaled in the front plate 21. To the shaft 206 is also fixed a tape feed roller 207 (FIG. 1) which cooperates with a pressure roller 208 carried on a pivoted bracket 209 actuated by a spring 211.

The spacing bar 197 is normally biased upwardly by a spring 212 and bears against portion 196 of lever 195. As lever 195 is permitted by cam 194 to rotate thus causing portion 196 to rise, the spring 212 is instrumental in raising the spacing bar 197 with the pawl 202 thereon, so that pawl 202 picks up the next tooth on the ratchet 205. The extent of vertical movement of bar 197 is governed by the shoulder 213 of a bar 214 slidably mounted on studs 215 and 216. Then, as cam 194 continues to rotate, it will cam the lever 195, and hence the portion 196, downwardly to effect the stepping of ratchet 205 through one angular step.

Figure 11:
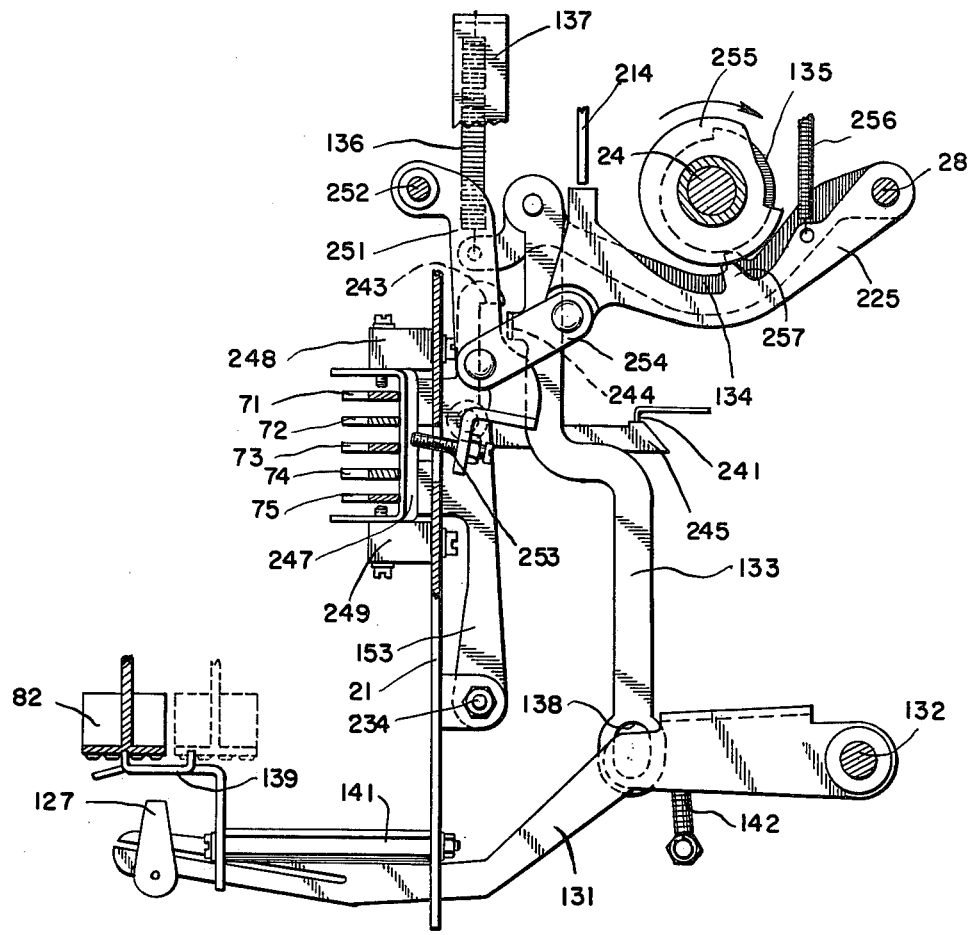
FIG. 11 is a sectional view showing the printing operating mechanism and the function lever reset mechanism.

In the event double spacing automatically every fifth character is desired, the following mechanism is provided. The cam member 178 is provided with a cam extension 217 which cooperates with a bell crank lever 218 which is pivotally carried on stud 215. Lever 218 is normally urged counterclockwise (FIG. 5) by a spring 219 to bring the stud 221 thereon against a depending portion 222 of slide member 214 to thereby hold the slide 214 in its rightward position against studs 215 and 216. When shaft 174 is rotated to bring the index notch 191 (FIG. 1) in registry with the "E" (enciphering) position, the cam portion 217 will become effective to rotate bell crank 218 clockwise (FIG. 5) against the action of its spring 219. However, a further spring 223 is provided between lever 218 and slide 214, so that when the lever 218 is rotated clockwise it will, through spring 223, urge the slide 214 leftwardly to remove the shoulder 213 out of the path of portion 196 of spacing lever 195, and to bring shoulder 224 into the path of a function reset lever 225 (FIGS. 5 and 11).

With this setting, the shoulder 213 no longer serves as the limiting stop for governing the spacing or feeding movement of the feed pawl 202, this function being transferred to a double space cam member 226, which in the present embodiment of the invention is provided with four notches spaced ninety degrees apart. Cam 226 is integral with ratchet 205 and cooperates with the space control feed lever 203. Lever 203 is provided with a laterally extending portion 227 and is adjustable about pivot 201 by means of eccentric screw 228 and spring 229 to properly align the portion 227 with the notches in cam 226. Now, when bar 197 is reciprocated by means of spring 212 and cam 194 the projection 227 is permitted to sense the periphery of cam 226 upon each reciprocation. When the projection 227 encounters the apices of cam 226, the pawl 202 picks up only one tooth of ratchet 205. However, upon every fifth step the projection 227 will encounter a notch in the cam 226, whereupon the bar 197 is permitted to rise a greater distance and thus pawl 202 will pick up two teeth instead of one and thereby cause ratchet 205, and hence feed roll 207 to rotate an extra step. A detent lever 231 biased by a spring 232 cooperates with ratchet 205 to hold ratchet 205 in its stepped position.

When certain functions are to be performed, it is desired to suppress the spacing operation, and to achieve this result the space suppression lever 152 is pivotally supported on a pivot 234 mounted on the inside of plate 21. Lever 152 is provided with projections adapted to cooperate with function selecting bars 71, 72, 74, and 75. Lever 152 terminates at its upper end in a hook portion 236 which cooperates with a projection 235 integral with the space bar 197, such that when the lever 152 is actuated clockwise (FIG. 6) by the selective operation of bars 71, 72, 74, or 75 as previously described, the hook portion 236 will be positioned directly above the projection 235 to thereby prevent the upward movement of the bar 197, and hence pawl 202. The pawl 202 is thus prevented from picking up a tooth on the ratchet 205, and hence the ratchet is not rotated so long as hook 236 blocks lug 235.

Lever 152 carries pivotally thereon a latch 237 which is normally biased counterclockwise about its pivot 238 by a spring 239. Thus, when lever 152 is actuated clockwise by any of the bars 71, 72, 74 or 75 the latch 237 will engage a ledge 241, thereby holding level 152 in its clockwise position with the hook 236 in blocking position over lug 235. However, at the end of the cycle of revolution of cam 194 the bar 197 is given a downward thrust sufficient to effect the disengagement of latch 237 from ledge 241, since bar 197 is provided with a laterally directed lug 242 which strikes latch 237.

Having reference to FIG. 11, it is observed that the printing suppression lever 153 is also pivotally mounted on pivot 234 carried on plate 21. Moreover, lever 153 is provided with lugs which cooperate with function selector bars 71, 72, 74, and 75 as in the case of space suppression bar 152. Lever 153 also terminates at its free end in a hook portion 243 which cooperates with a laterally directed lug 244 integral with the printing link 133. Lever 153 also carries pivotally thereon a latch 245 similar to latch 237. Thus, when lever 153 is actuated clockwise by any of the bars 71, 72, 74 or 75 the hook portion 243 is positioned over the lug 244 thus preventing the lever 134 from responding to the pull of spring 136 during the rotation of cam 135.

The function control bars 71 to 75 which are pivotally articulated at 246 (FIG. 3) to the front plate 21 and biased toward the code bars 61 to 65 by individual springs 167 are governed in their movement toward and away from code bars 61 to 65 and levers 151, 152, and 153 by a reset bail member 247 (FIGS. 1, 3, and 11) pivotally supported on brackets 248 and 249 mounted on front plate 21. Referring to FIG. 11, a function reset lever arm 251 is pivotally mounted at 252 on the frame 29 and is provided at its free end with an adjusting screw 253 with which it cooperates with the bail member 247. Lever 251 is connected by a link 254 to the function reset lever 225. The lever 225 is normally held in operable relation with cam 255 by a spring 256. When the lever 225 rides on the high part of cam 255 the lever arm 251 is held in its clockwise position so that through screw 253 the bail 247 is maintained in a position to hold the bars 71 to 75 against the action of their individual springs 167, thereby holding bars 71 to 75 clear of code bars 61 to 65 and bars 151, 152, and 153. As the follower portion 257 of lever 225 falls into the depression in cam 255, the bail 247 is actuated rightwardly (as viewed in FIG. 11) to permit bars 71 to 75 to cooperate with code bars 61 to 65 and bars 151, 152, and 153.

The orientation device is shown in FIGS. 13, 14, and 15 and comprises a graduated scale member 158 which is fixedly mounted on the frame 29 and carries a clamping screw 259 which cooperates with an orientation plate 261 which, in turn, is rotatably mounted on the shaft 24. An index notch 262 is provided on the edge of plate 261 to cooperate with the indications on plate 258. Having reference to FIG. 4, an axially expansible or extensible sleeve 263 is mounted on shaft 24, and a spring 264 mounted thereon extends the sleeve 263 to impart pressure to the friction material 265 embracing the selector cam sleeve 26, thereby providing a frictional driving means for the selector cam sleeve 26.

Plate 261 has projecting therefrom a stud 266 on which is pivotally supported a lever 267 having a depending arm 268 which cooperates with a contact pair 269 which, in turn, controls a circuit for energizing a magnet 271 (FIG. 19) that controls the operation of the ciphering device or rotor, shown in FIGS. 22 to 25, as will hereinafter appear. Incidentally, contact 269 also controls the two sets of mixer magnets 45 and 353. An arm 272 of lever 267 cooperates with a cam 273 which is provided with a peripheral cam notch through the instrumentality of which lever 267 is oscillated periodically to cause a periodic closing of contact pair 269.

Also mounted on stud 266 is a bell crank lever 274, one arm 275 of which cooperates with a start-stop disc 276 integral with sleeve 26, the other arm 277 of which cooperates with an arcuate slot 278 in a release lever 279 pivotally mounted on a pivot shaft 281 suitably carried in frame 29. Release lever 279 cooperates at its free end with the selector magnet armature lever 51 and is normally biased counterclockwise by a spring 282. When the selector magnet 52 is energized due to marking current on the line, the end of armature 51 will function to block the counterclockwise movement of release lever 279. However, in response to a spacing impulse (no current on the line), the end of armature 51 will be swung free of the end of lever 279 thus permitting lever 279 to respond to the pull of its spring 282 thereby bringing lever 279 into contact with a start-stop cam 283. At the same time, lever 274, through the articulation of its arm 277 with arcuate slot 278 of lever 279, will be actuated counterclockwise to disengage its arm 275 from the start-stop disc 276, thereby initiating the rotation of sleeve 26.

Upon the rotation of sleeve 26, the cam 273 thereon will permit the periodic closure of contact 269, and cam 283 will cooperate with the cam follower portion 284 of arm 277 to return lever 279 into blocking relation with armature lever 51, and if lever 51 is actuated to its marking position, the lever 279 will remain in the position shown in FIGS. 14 and 15. Also, upon the rotation of sleeve 26, the selector cams 32, the armature extension lock lever cam 285 and the function clutch trip cam 286 will be rotated therewith (FIG. 4). The rotation of cams 32 effect the selective operation of selector levers 27 and cipher levers 38 in the manner disclosed in copending application Ser. No. 513,374, filed Dec. 8, 1943, in the name of A. H. Reiber, deceased. The cam 285 controls the operation of a lock lever (not shown) in the manner disclosed in H. L. Krum U.S. Pat. No. 1,783,392; and the cam 286 functions to control a clutch trip lever 287 to render a clutch 288 operative, in the manner disclosed in W. J. Zenner U.S. Pat. No. 2,339,313.

Since the bell crank lever 274 is carried on the orientation plate 261, it is movable therewith so that as the plate 261 is rotated, the pivot 266 for carrying lever 274 will revolve about shaft 24 in a planetary manner, and since the distance between pivot 266 and the apex of cam 273 in the stop position as shown in FIG. 14 is invariable, the stop position of cam 273 may be varied by the rotation of plate 261 as shown in FIG. 15. Because of the fact that the disengagement of bell crank 274 is controlled by the release lever 279 in all positions of lever 274, the arcuate slot 278 is provided which is of appropriate conformation to compensate for the movement of said lever.

TRANSMITTER

The transmitting device is shown in FIGS. 16 to 21, inclusive, and comprises a base portion 301 which houses a group of key levers 302 which are pivotally supported in well known manner in the housing 301 and are spring held in their upward position and are also provided with keytops (not shown) arranged in a bank similar to a Teletype keyboard. Positioned below the key levers 302 and directed transversely thereof are a series of code bars 303. The key levers 302 cooperate with the saw toothed upper edges of the code bars 303 in well known manner to set the code bars in varying permutations. Operatively connected to the code bars 303 through the instrumentality of pins or studs 304 are a corresponding series of levers 305 pivotally supported on a pivot shaft 306. The upper end of each lever 305 carries a coupling element 307, the disc portion 308 of which fits into the open ended slot in the extremity of the upper arm of the lever 305. Integral with the disc portion 308 of coupling element 307 is a rib portion 309 of rectangular cross section. Also, integral with the rib portion 309 and arranged perpendicularly therewith and centrally thereof is a portion 311 of rectangular cross section, which performs the dual function of retaining the coupling 307 in slidable relation with lever 312 and also for cooperating with the depending arm 349 of bell cranks 348 to control the closure of contacts 319, as will presently appear.

Levers 305 are pivotally articulated to a corresponding series of contact operating levers 312 by means of said coupling elements 307 (FIG. 17). To achieve this result the horizontal arm of lever 312 is provided with an open-ended slot 313 which is adapted to receive the portion 309 of coupling element 307. Levers 312 are pivotally mounted on a pivot shaft 314 and each lever is provided with a cam follower arm 315 and a contact operating arm 316. Normal counterclockwise bias is imparted to levers 312 by individual springs 317. Secured to each arm 316 is an insulator 318 which cooperates with individual contacts 319 of a series of transmitting contacts. Cooperating with the cam follower arms 315 are a corresponding series of transmitting cams 321 carried on a shaft 322.

The power for operating the apparatus according to the pesent invention is derived from a motor (not shown) through a pinion 323 mounted on the shaft 324 thereof. This power is transmitted through gear 325 to shaft 322. Also fixed to shaft 322 is a gear 326 which serves the dual purpose of transmitting power through gear 327 to shaft 24 of the printer unit, and also through gear 328 to shaft 329.

Cams 321 are carried on a sleeve 331 which is operatively connected to shaft 322 through a clutch 332, comprising a gear 333, secured to the cam sleeve 331 and a gear 334 secured to shaft 322. Pivotally carried on a lug 335 on sleeve 331 is a main pawl 336 and an auxiliary pawl 337 which are normally biased clockwise by a spring 338. Associated with pawls 336 and 337 is a trip-off mechanism comprising a trip-off lever 339 having a depending portion similar to the depending arm of the contact control levers 305, which cooperates with a pair of studs similar to studs 304, on the universal code bar. Resting on the shoulder 341 of trip-off lever 339 is the horizontal arm of a clutch release lever 342, the vertical arm of which cooperates with pawl 336 to hold pawls 336 and 337 out of operative engagement with gears 333 and 334. Upon operation of any key lever 302, the universal bar is also actuated, as is well known, to impart counterclockwise rotation to lever 339 to effect the disengagement of shoulder 341 from lever 342 to permit spring 343 to bias lever 342 clockwise to disengage the vertical arm thereof from pawl 336. Springs 338 will be thereupon effective to engage pawls 336 and 337 with gears 333 and 334, to effect a single rotation of cam sleeve 331. An arm 344 is cooperatively related to lever 342 to effect through the instrumentality of a cam on cam sleeve 331, counterclockwise rotation of lever 342 to effect the re-engagement of the horizontal arm with the shoulder 341.

Provision has been made to limit the rotation of clutch 332 to a single rotation, in the event a key lever 302 is held depressed. To achieve this result a lever 345 is provided which is mounted on pivot 306 and is provided with a shoulder 346 adapted to confront shoulder 341. Shoulder 346 is disposed at a slightly higher level than shoulder 341, so that, following a normal release of lever 342 by the operation of a key lever 302 and the return thereof by arm 344 and with the key lever held depressed, lever 342 will engage shoulder 346, and then, when the key lever is released, the end of lever 342 rides off shoulder 346 onto shoulder 341, thus preventing lever 342 from escaping, except upon in response to a further operation of a key lever.

The cam notches 347 of cams 321 are disposed around the cam sleeve 331 in a helical manner, so that the transmitter contacts 319 are operated sequentially. Cooperating with the contact levers 312 are a corresponding plurality of bell crank levers 348, each having a depending arm 349, adapted to cooperate with portion 311 of the coupling elements 307, and a horizontal arm 351 adapted to cooperate with the armature 352 of an associated ciphering magnet 353. As will hereinafter appear, the energization of the ciphering magnets 353 is under the control of the ciphering unit 14. The signal transmitted by the contacts 319 is determined under the joint control of code bars 303 and ciphering magnets 353, in the manner disclosed in copending application Ser. No. 513,375, filed Dec. 8, 1943, in the name of A. H. Reiber, deceased.

Bell crank levers 348 are normally biased in a clockwise direction about pivot shaft 354 by individual springs 355. However, levers 348 are periodically actuated to their counterclockwise position, shown in FIG. 16, by a bail 356 which is operated by a lever 357 actuated by a cam (not shown) carried on shaft 322. After levers 348 have been actuated to their counterclockwise position by bail 356, they will be retained in this position by armatures 352 if magnets 353 are de-energized as shown in FIG. 16. IF certain of the magnets 353 are energized, the armature 352 thereof will be swung out of the path of the shoulder or arm 351 of its associated lever 348, so that spring 355 is thereby enabled to rotate lever 348 to its clockwise position.

Thus, if a lever 305 is actuated to its counterclockwise position and its associated lever 348 is actuated to its clockwise position, then movement of lever 312 in a counterclockwise direction under the pull of spring 317, to close its contact 319 will be prevented because portion 311 will be blocked by arm 349. A similar condition will result if a lever 305 is actuated to its clockwise position and its associated lever 348 is actuated to its counterclockwise position. However, if the levers 305 and 348 assume the positions shown in FIGS. 16 and 17, or vice versa, then the movement of levers 312 will not be blocked by portion 311, and the contact 319 will consequently be closed.

Power is imparted to shaft 329 by gear 328 through the instrumentality of clutch mechanism 358 (FIGS. 16 and 20). The clutch mechanism 358 comprises the clutch magnet 271, the armature 359 of which controls a clutch release lever 361 pivotally mounted at 362. Upon energization of magnet 271, the armature 359 is attracted, thereby permitting spring 363 to bias lever 361 clockwise. A pin 364 carried by lever 361 acts upon arm 365 of a 3-arm lever 366 pivoted at 367. The extremity of arm 365 cooperates with a pawl 368 of clutch 358. A spring 369 stretched between pin 364 and the end of an arm 371 of lever 366 whereby a normal clockwise bias is imparted to lever 366, to return arm 365 into arresting relation with pawl 368. The third arm 372 of lever 366 serves to provide a means for manually releasing the clutch 358 for rotation, as will hereinafter appear.

As shown in FIG. 22, arm 372 is disclosed as cooperating with a screw 373 adjustably carried on a bail member 374 pivotally supported on a pair of pivots 375, one of which is shown in FIG. 22. As will hereinafter appear, bail 374 is adapted to be actuated clockwise upon the manual operation of any one of a set of key members 376 rightwardly (as viewed in FIG. 22).

Upon the automatic release of clutch 358, as previously described, the pawl 368 is rotated counterclockwise about its pivot 377 to bring its tooth 378 into engagement with the constantly rotating driving gear 379 through the instrumentality of a spring 381. Pawl 368 carries adjacent the tooth 378, a pin 382 which cooperates with a second pawl member 383. Pawl 383 is also biased by a spring 381 so that when pawl 368 is rotated by its spring 381 the pawl 383 will follow along, whereby pawls 368 and 383 are permitted to grasp a tooth on the driving gear. Pawl 383 also functions to prevent overrunning of the clutch. The plate 384 on which the pawls 368 and 383 are carried is provided with a cam surface 385 which cooperates with a follower arm portion 390 of lever 361 so that prior to the completion of a cycle of rotation, the arm 365 will be returned to its position of blocking pawl 368. A detent lever 386 pivoted at 362 and spring-biased by a spring 387 cooperates with a pin 388 carried on plate 384 to prevent chattering of the clutch 358.

Having reference to FIG. 19, a contact bank 392 is carried on the frame of the transmitter unit, which contacts are controlled by a lever 393, the upper end of which is shown in FIG. 19. Lever 393 is shown in FIG. 24 as pivotally supported at 394 to the side plate 395 of the ciphering device.

Clamped to shaft 329 is a crank member 396 (FIGS. 20 and 24) which carries thereon a stud 397 on which is pivotally supported a link 398 which is the operative connection between the transmitter unit and the ciphering unit. As shown in FIG. 24, link 398 is connected at its upper end to a stud 399 secured to arm 401 of an operating bail member indicated generally by the numeric 402. Bail member 402 is rockably supported by journals 403 on the side frames of the ciphering unit. Bail member 402 is provided with a pair of depending arms 404 to the extremities of which are connected links 405 through the instrumentality of which power is imparted to a reciprocating bail 406 (FIGS. 22 and 23). As the shaft 329 is rotated, the crank 396 (FIG. 24) causes link 398 to reciprocate thereby causing bail 402 to rock about pivots 403.

The ciphering unit shown in FIGS. 22 to 24 comprises a plurality of code changing wheels or rotary discs 408 which are rotatably carried on a shaft 409 suitably mounted in the ciphering unit. Discs 408 are provided with regularly spaced peripheral notches 411 which cooperate with individual pawls 412, each pivotally carried on a plate 413. The code changing wheels or code wheel commutators 408 are modifications of the code wheels shown in U.S. Pat. No. 1,510,441, issued to E. H. Hebern, Sept. 20, 1924, comprising essentially two rings of contacts on opposite radial faces thereof in which each contact on one side of a code wheel commutator is connected by a wire constituting a link in a designating interconnection to some (any) one connection on the other side. Thus, the stepping of the discs completes various circuits through the discs or code wheels 408, as represented schematically by label 414 in FIG. 26.

The members 413 are slidably supported on the bail 406 and are provided with depending portions 415 which cooperate with armatures 416 of magnets 417. When the magnets 417 are de-energized, their armatures 416 are held retracted by springs 418, to be positioned in blocking relation with members 413. Members 413 are normally biased leftwardly, as viewed in FIG. 22, by springs 419 individual thereto, in such a manner that member 413 will move with the bail 406 when the armature associated therewith is attracted, or the spring 419 will stretch when the bail 406 moves and the member 413 is blocked by its associated armature 416.

When clutch 358 is released, shaft 329 will rotate to effect, through link 398, the operation of bail 406. As bail 406 reciprocates, one or more of the bars 413 which have been released by armatures 416, due to the energization of magnets 417, will be actuated leftwardly by their respective springs 419, thus causing their pawls 412 (which are biased by springs 420) to pick up the following tooth or notch 411. Then when the bail 406 is returned to its rightward position, as viewed in FIG. 22, it actuates (through screw studs 421) the bars 413 rightwardly to cause the portions 415 to again engage armatures 416.

The bars 413 are provided with shoulders 422 which, when the bail 406 is actuated leftwardly, strike the lower end of a lever 423, pivoted at 430, to disengage the upper end thereof from a notch 411 to permit the stepping of code wheel 408 by pawl 412. Lever 423 which is spring biased by a spring 424 also serves to lock the code wheel 408 against acccidental movement.

Each code wheel 408 is also provided on its periphery with a notch 425 which is adapted to cooperate with a contact controlling lever 426 pivoted at 427. Lever 426 is normally biased clockwise (as viewed in FIG. 22) by a spring 428 and functions, when a notch 425 is sensed, to close a contact 429 for a purpose hereinafter described.

The manually operated members 376 are normally urged leftwardly (as viewed in FIG. 22) by individual springs 429. Members 376 are provided with cam portions 431 which cooperate with armatures 416 so that when member 376 is actuated rightwardly the portion 431 acts to cam its associated armature 416 downwardly to effect the disengagement of said armature from its associated member 413. Thus it is observed that the result effected by manually operating a member 376 is the same as effecting the release of a member 413 by the electromagnets 417.

Having reference to FIG. 24, an upper manual trip push bar 432 and a lower manual trip push bar 433 are provided in connection with the manual operated members 376. Push bars 432 and 433 are normally urged rightwardly by their springs 434 and 435, respectively. Bar 432 cooperates with arm 436 of lever 393. Lever 393 is normally biased clockwise by a spring 437 to hold arm 436 against the bar 432 as shown in FIG. 24. Then when bar 432 is actuated leftwardly the arm 436 falls off of the shoulder 438 and permits spring 437 to rotate lever 393 sufficiently to close contact pair 537 and open contact pair 515. The closing of contact 537 completes a circuit for clutch magnet 271 (FIG. 19) to initiate rotation of shaft 329, which through link 398 effects operation of the coding mechanism shown in FIGS. 22 to 25. So long as the push bar 432 is held depressed the contact 537 will tend to close and operation of the coding mechanism will be repeated. Provision is made for preventing repetition, by associating with the bar 432, a nonrepeat push bar 433. Upon depression of the bar 433 a shoulder 442 thereon cooperates with a depending portion on bar 432 to effect the disengagement of portion 436 from shoulder 438 to initiate the operation of the coding mechanism, as previously described. However, despite the holding of bar 433 (and hence bar 432) in the depressed position, the projection 443 (due to the action of the crank shaft member 396) will strike the top surface of projection 444 of bar 433, to disengage the projection 442 from bar 443 and permit the return of bar 432 to its rightward position after a single operation.

ELECTRICAL CIRCUIT

Having reference to FIG. 26 there is shown schematically an electrical circuit arrangement for the apparatus according to the present invention. In the upper right-hand corner of the figure is shown diagrammatically a line local switch 445, a sending line cord plug 446, a receiving line cord plug 447, a break relay 448, a break lock relay 449, a break key 451 and a break lock release key 452. Also shown in FIG. 26 as associated with the switch 445 are the electrical circuits for the transmitter unit indicated by box 453, the printer unit indicated by box 454, and the converter or ciphering unit indicated by box 455.

In the box 453 are shown schematically the transmitting cams 321, the start-stop cam 456 and control cam 457 carried on transmitting shaft 322. Also, the transmitting contact levers 312 and contacts 319 are shown, as well as the ciphering or mixer magnets 353 and associated elements, the clutch magnet 271 and contact control lever 393.

In the printer unit exemplified by box 454 are indicated schematically the cipher magnets 46 and associated elements, the selector magnet 52, and the contact pile-ups of the control switch 458. Switch 458 comprises a cam element 459, FIG. 3, which is variously notched to govern, through a group of levers 461 (FIG. 1), a plurality of banks of contacts 462, which in turn control the apparatus when operating under various conditions, as secret, plain English, encipher and decipher. In the ensuing description, and having reference to FIG. 26, the various conditions of operation shall be designated S, P, E, and D in which S signifies "secret," P signifies "plain English," E signifies "encipher" and D signifies "decipher." Also shown in box 454 are the contact lever 268, contact 269, and cam 273.

The ciphering unit 455 is shown schematically in FIG. 26 with the code wheel portion indicated as 414. Also indicated are the magnets 417, contacts 429 and contact operating levers 426.

In connection with FIG. 26, the switch 445 is shown in the "line" position, with contact 463 open. The break relay 448 is normally energized in both the line and local positions and is de-energized upon the operation of the break key 451; this operation being based on the fact that the sending and receiving lines are connected to line jacks 480 wired in series. The line circuit extends from jacks 480 over line wire 490 to station 470. One lead 464 of the sending line cord is wired to contact 465 of the break key 451, and from thence to junction 466, over conductor 467, through contact 468, (now closed) over conductor 469, then through one or more of the transmitting contacts 319 (sequentially), over conductor 471, through contact 472 (now closed) and over conductors 473 and 474 to plug 446. One lead 475 of the receiving line cord extends through the winding of the break relay 448, over conductor 476, through contact 477, over conductor 478, through the winding of receiving magnet 52, over conductor 479, through contact 481, over conductor 482 to receiving plug 447.

In the operation of the circuit, the plugs 446 and 447 are inserted in their respective jacks 480 whereupon the relay 448 and selector magnet 52 are energized. If break lock relay 449 is de-energized, transmission is prevented because of the short circuit effected by contacts 545. This short circuit is effective only in the "E" and "S" positions of switch 458, since in the "P" and "D" positions, the contacts 494 are open. This short circuit is traced from contacts 545, through the armature of relay 449, over conductor 473, over conductor 546, through contact 494, over conductor 547 to junction 466, then over conductors 467 and 548 to contact 545. However, to place the circuit in condition for receiving or transmitting the break lock release key 452 is operated momentarily to close contact 483 to complete an energizing circuit for relay 449 from positive battery through terminal block 484 of convertor unit 455, over conductors 485 and 486, through winding of relay 449, over conductor 487, through contact 483 (closed momentarily), over conductor 488 to junction 489, then through contact 491 of relay 448 to negative battery. Upon the energization of relay 449, a locking circuit is established therefor from positive battery, through terminal block 484, over conductors 485 and 486, through relay 449, then through contact 492 (now closed) of relay 449 and over conductor 493 to junction 489, then through contact 491 to negative battery.

The various conditions of operation are governed by the control switch 458, the opened and closed position of the different sets of contacts being determined by the notches in cam sleeve 459. In like manner the contacts of the control switch 458 assume, in the positions of "E," "D," and "P" the positions indicated by the double pointed arrows.

With the line local switch 445 in the "line" position and the control switch 458 in the plain English or "P" position, the operation of the system is as follows: Both line cords 446 and 447 are plugged into their respective jacks 480, and the relays 448 and 449 are energized in the manner previously described. In this condition of operation an additional battery is supplied to relay 449 over a circuit extending from positive battery through contact 497 (now closed) of control switch 458, over conductors 499 and 486, through the winding of relay 449, through contact 492, over conductor 493 to junction 489, then through contact 491 of relay 448 to negative battery. The purpose of the additional circuit just described is to supply battery to relay 449 in the event the maze or code wheel unit 414 is removed, as it was previously noted that battery for relay 449 was also obtained through terminal 484 over conductor 485. It is obvious then that when the unit 414 is removed, transmission over the line is prevented in "S" position. In the "P" position nothing occurs through the cryptographic portion of the present apparatus because the control switch contact groups 495, 496, and 498 are maintained open in this position. In this condition of operation the signal impulses are received by the receiving magnet 52 and since the ciphering magnets 46 are not affected, plain English copy is printed. Similarly, in transmission the magnets 353 are not energized and the signals generated at contacts 319 are in accordance with plain English. The stepping magnets 417 will not operate the rotor unit since the circuit from negative battery through contacts 513 of the break lock relay through contacts 500 and 498, over conductor 525, through contacts 524 (closed shortly after the cam sleeve begins rotation), over conductors 523 and 516, through contacts 515, to clutch magnet 271 to battery, and over conductor 519 to the stepping magnets 417, is opened at contacts 498.

In the condition of operation identified as secret the contacts in the control switch 458 are set to the "S" position. Incidentally, the contacts of switch 458 are shown in FIG. 26 in the "S" position. In this position the contact 500 is closed and the contact 494 is open, the same as in the "P" position. Also, the contact groups 495 and 496 are in their closed position, and contact 497 is open and contact 498 is closed.

For operation in the "S" position the line local switch is still in the "line" position, as shown in FIG. 26. When enciphered code signals are received, the signal impulses pass through the receiving plug 447 and over the previously described circuit including relay 448, contact 477, conductor 478, receiving selector magnet 52, conductor 479, contact 481, conductor 482 and back to plug 447. It is understood, of course, to properly decipher the line signals, the ciphering units 455 at each end of the line must be in phase so that the enciphered signal may be deciphered by the same code signal that effected its encipherment. For this purpose, the ciphering magnets 46 are provided in the printer unit 454 and which are included in a local circuit extending from positive battery, through terminal 484 of the ciphering unit 455, then through the series of code wheels 414, through terminal 501, over conductors 502, through contacts 496 (now closed) of the control switch 458, over conductors 503, through the windings of selected ones of ciphering magnets 46, over common conductor 504 to junction 505, then over conductor 506, through contact 269 (now closed) to junction 507, over conductor 508, through contact 498, over conductor 509 to junction 511, then through contact 500, over conductor 512 and through contact 513 (now closed) of relay 449 to negative battery. As previously described, contact 269 is pulsed cyclically in accordance with the operation of the printer, and the code wheels 414 of the ciphering unit 455 are likewise stepped in phase therewith. Each time the contact 269 is closed, upon rotation of the selector cam sleeve of the printer unit, a circuit for clutch magnet 271 is completed to initiate operation of the ciphering unit 455. When the contact 269 is thus closed, a circuit is completed from battery, through the winding of magnet 271, over conductor 514, through contact 515, over conductors 516 and 517 to junction 505, then over the previously described circuit to negative battery through contact 513 of relay 449. The closing of contact 269 cyclically also controls the energization of the code wheel stepping magnets 417 over a circuit extending from positive battery, through the windings of magnets 417, through contacts 429, then over conductor 519, through contact 515, over conductors 516 and 517 to junction 505, then over the previously described circuit to negative battery through contact 513. The enciphered signals thus received through the receiving plug 447 are deciphered by the conjoint operation of receiving magnet 52 and cipher magnets 46 over the previously described electrical circuits.

In the transmission of enciphered signals in "S" operating position, the sending plug 446 is inserted in the jack 480 of the station shown in FIG. 26, with the line local switch 445 still in the "line" position. In this condition of operation the signal line circuit extends, as previously described, over the circuit extending from the plug 446, over conductor 464, through contact 465 to junction 466, then over conductor 467, through contact 468, over conductor 469, through the transmitting contacts 319, over conductor 471, through contact 472, and over conductors 473 and 474 to plug 446. It is understood, of course, that the signal transmitted through the transmitting contacts upon the depression of a key lever, is altered by the operation of ciphering magnets 353 as determined by the ciphering unit 455. The cipher magnets 353 are included in a circuit extending from positive battery, through terminal 484, then through the maze or series of code wheels 414, through terminal 501, over conductors 502, through contacts 495 (now closed) of the control switch, over conductors 512, through the windings of selected ones of the cipher magnets 353, over common bus bar or conductor 522, through contact 515, over conductors 516 and 523, through contact 524 (which is closed cyclically upon each actuation of a key lever), over conductor 525 to junction 507, then over the previously described circuit including contact 513, to negative battery. It is understood that the previously described circuits for cipher magnets 46, clutch magnet 271 and stepping magnets 417 are also operative, permitting "plain English" copy to be printed by the sending as well as the receiving units during "S" transmission.

In the enciphering or deciphering condition the line local switch 445 is actuated in a clockwise direction (as viewed in FIG. 26) to the "local" position to close contact 463 thereof. The control switch 458 is adjusted so that contact 500 is open and contact 494 is closed. Upon the closing of contact 494 the sending circuit through plug 446 is short circuited, preventing signals from being transmitted over the line should the control switch be in the "E" or "D" position with the unit in "line" position. Upon the opening of contact 500 the ground or negative battery associated with contact 513 of relay 449 is removed from the various circuits previously described in connection with the operation of the system in the "S" position, and the negative battery associated with contact 463 is substituted therefor, over conductor 526 extending from junction 511 to contact 463. The circuits, previously described for cipher magnets 46 and 353 extending from positive battery through the terminal 484 of ciphering unit 455 extend over conductor 526 to the negative battery associated with contact 463.

With the line local key 445 in the "local" position, which is the position for enciphering and deciphering operation, a circuit between the transmitter and printer is closed from positive battery, through contact 527 (now closed), over conductor 469, through transmitting contacts 319, over conductor 471, through contact 528 (now closed), over conductor 529, through contact 531 (now closed), over conductor 478, through the winding of receiving magnet 52, over conductor 479, through contact 532 (now closed), to negative battery.

While the line local switch 445 is in the "local" position the line circuit through the receiving plug 447 is short circuited and extends over conductor 475, through the winding of break relay 448, over conductor 476, through contact 533 (now closed), and over conductor 482 to plug 447. Similarly, the line circuit through the sending plug 446 is short circuited and extends over conductor 464, through contact 465, to junction 466, over conductor 467, through contact 534 and over conductors 473 and 474 to plug 446. When the break relay 448 becomes de-energized due to the breaking or opening of the line circuit for any reason, whether the unit is in the line or local position, armature of relay 448 will close contact 535 to complete an obvious circuit for ringing the alarm bell 536.

It is recalled that upon the manual operation of bars 432 and 433 (FIG. 24), the contact lever 393 is actuated to open contact 515 and close contact 537. It is also noted with reference to FIG. 26, that during the automatic operation of the system according to the present invention the energizing circuits for clutch magnet 271 and stepping magnets 417 were established through contact 515. During manual operation, the circuits for magnets 271 and 417 are completed through contact 537 (closed upon manual operation of bars 432 and 433).

Although a preferred embodiment of the invention has been shown in the drawings and described in the foregoing specification, it will be understood that the invention is not limited to this embodiment but is capable of modification and rearrangement without departing from the spirit of the invention and within the scope of the appended claims.

What is claimed is:

1. In combination, a line circuit, a converter comprising in a unitary structure, transmitting instrumentalities, printing instrumentalities, ciphering instrumentalities, an electrical circuit embracing said instrumentalities, supervisory means in said electrical circuit for determining the cooperative relationship between said instrumentalities, said means comprising a first relay adapted to be normally included in said line circuit, a second relay for controlling said transmitting instrumentalities, key controlled contact means effective upon momentary operation for energizing said second relay, a locking circuit for said second relay controlled by said first relay, and a break contact effective upon operation to disable said transmitting instrumentalities for line transmission and enabling said transmitting instrumentalities for local transmission, and means for determining the effectiveness of said ciphering instrumentalities.

2. In combination, a signal line, a converter comprising in a unitary structure, transmitting instrumentalities, receiving instrumentalities, ciphering instrumentalities, a control circuit for said converter including a transmitting circuit, a receiving circuit, separate terminal plugs for said circuits, jacks for said plugs, said jacks connected in series in said signal line, means for connecting said transmitting instrumentalities to said line for transmission of messages over said line, means for connecting said receiving instrumentalities to said line for reception of messages over said line, cyclically operated pulsing means for determining the effectiveness of said ciphering instrumentalities, and means for short circuiting said connecting means for establishing communication between said transmitting and receiving instrumentalities.

3. In a telegraph system, interconnected stations, converters at each station comprising transmitting and receiving apparatus, a signal line connected to said stations, said transmitting apparatus comprising a series of cam controlled transmitting contacts, means for controlling said contacts permutably, and means for altering the control imparted to said contacts by said means, said receiving apparatus comprising a selector mechanism responsive to received enciphered signals generated by any transmitting apparatus, and means for re-translating said altered signal to effect printing in correspondence thereto, a ciphering device at each station, and a switching device for controlling the functions of said station apparatus, comprising a line-local switch, a pair of relays and a pair of key controlled contacts, whereby the operation of said system is initiated upon the momentary operation of one of said key controlled contacts to effect the energization of one of said pair of relays.

4. In a telegraph system, interconnected stations, converters at each station comprising transmitting and receiving apparatus, a signal line connected to said stations, said transmitting apparatus comprising a series of cam controlled transmitting contacts, means for controlling said contacts permutably, and means for altering the control imparted to said contacts by said means, said receiving apparatus comprising a selector mechanism responsive to enciphered signals generated by any transmitting apparatus, and means for retranslating said altered signal to effect printing in correspondence thereto, an electromagnetically controlled ciphering device at each station, and pulsing means cyclically operable by said receiving apparatus for controlling said ciphering device, whereby said altering means is rendered effective.

5. In a telegraph system, interconnected stations, converters at each station comprising transmitting and receiving apparatus, a signal line connected to said stations, said transmitting apparatus comprising a series of cam controlled transmitting contacts, means for controlling said contacts permutably, and means for altering the control imparted to said contacts by said means, said receiving apparatus comprising a selector mechanism responsive to enciphered signals generated by any transmitting apparatus, and means for retranslating said altered signal to effect printing in correspondence thereto, a ciphering device comprising a plurality of code changing wheels and stepping magnets therefor, and pulsing means cyclically operable by said receiving apparatus for controlling said magnets, whereby said altering means is rendered effective.

* * * * *